(12) United States Patent
Nakayabu

(10) Patent No.: US 7,832,496 B2
(45) Date of Patent: Nov. 16, 2010

(54) DEEP-HOLE BORING MACHINE AND DEEP-HOLE BORING GUIDE DEVICE

(75) Inventor: Tomomi Nakayabu, Hiroshima (JP)

(73) Assignee: Goei Co., Ltd., Higashi-Hiroshima, Hiroshima (JP)

( * ) Notice: Subject to any disclaimer, the term of this patent is extended or adjusted under 35 U.S.C. 154(b) by 205 days.

(21) Appl. No.: 12/076,513

(22) Filed: Mar. 19, 2008

(65) Prior Publication Data

US 2008/0236853 A1    Oct. 2, 2008

(30) Foreign Application Priority Data

Mar. 19, 2007 (JP) ............................. 2007-070978
Sep. 28, 2007 (JP) ............................. 2007-254067

(51) Int. Cl.
*E21B 15/04* (2006.01)
*E21B 7/04* (2006.01)

(52) U.S. Cl. ........................ 173/39; 173/31; 173/38; 173/192; 173/184; 408/234; 408/236; 408/705; 408/111; 408/135; 408/97; 408/56; 408/76; 175/220; 175/113; 409/201; 409/211

(58) Field of Classification Search .................. 173/31, 173/36, 38–39, 192, 184–185; 408/234, 408/236, 327, 705, 110–112, 135–136, 97, 408/57, 59, 76, 56; 125/20; 175/122, 162, 175/113, 170, 203, 220; 409/201, 211, 216, 409/178, 136

See application file for complete search history.

(56) References Cited

U.S. PATENT DOCUMENTS

| | | | | |
|---|---|---|---|---|
| 22,046 | A * | 11/1858 | White | 173/39 |
| 52,292 | A * | 1/1866 | Jung | 173/39 |
| 2,919,899 | A * | 1/1960 | Hitchcock | 173/40 |
| 3,626,513 | A * | 12/1971 | Pytlak | 408/115 R |
| 3,806,691 | A * | 4/1974 | Roach | 219/69.16 |
| 5,226,488 | A * | 7/1993 | Lessard et al. | 175/61 |
| 5,865,576 | A * | 2/1999 | Arai et al. | 409/201 |
| 5,885,037 | A * | 3/1999 | Heintzeman | 408/1 R |
| 7,207,751 | B2 * | 4/2007 | Feddersen | 408/115 R |
| 7,226,256 | B2 * | 6/2007 | Huang, Chin Piao | 409/137 |
| 7,487,576 | B2 * | 2/2009 | Baratta et al. | 29/26 A |
| 7,575,069 | B2 * | 8/2009 | Pavlik | 175/20 |

* cited by examiner

*Primary Examiner*—Rinaldi I Rada
*Assistant Examiner*—Michelle Lopez
(74) *Attorney, Agent, or Firm*—Squire, Sanders & Dempsey L.L.P.

(57) ABSTRACT

A deep-hole boring machine (100) includes a base (11) to be fitted to an upper face of a floor, a pillar (14), a fixing mechanism (40), a guide member (15), a rotary tool (17), a tool rotation driving section (16), a rising/descending mechanism (50), a guide base (60) and a tool guide mechanism (30). The deep-hole boring machine 100 can be used to bore a vertical hole or an inclined hole in a concrete in a construction site.

22 Claims, 13 Drawing Sheets

(FIRST EMBODIMENT)

(SECOND EMBODIMENT)

(SECOND EMBODIMENT)

DEEP-HOLE BORING MACHINE AND DEEP-HOLE BORING GUIDE DEVICE

CROSS-REFERENCE TO RELATED APPLICATION(S)

This application claims the foreign priority benefit under Title 35, United States Code, §119 (a)-(d), of Japanese Patent Application No. 2007-070978 and 2007-254067 respectively filed on Mar. 19, 2007 and Sep. 28, 2007 in the Japan Patent Office, the disclosure of which is herein incorporated by reference in its entirety.

BACKGROUND OF THE INVENTION

1. Field of the Invention

The present invention relates to a deep-hole boring machine capable of boring a deep vertical hole or a deep inclined hole in a concrete floor, as well as to a deep-hole boring guide device.

2. Description of the Related Art

In recent years, there is increasing need for earthquake resistant work for reinforcing a concrete building, in which frames are fixed to the concrete building with bolts to enhance the earthquake safety of the concrete building. In order to embed nuts into the concrete or to diagnose the inside of the concrete, it is necessary to bore holes in the concrete.

Generally, a diamond core bit is used to bore holes in the concrete.

However, if a core bit having a large diameter of 25 mm to 45 mm (which is mostly used presently in this industry) is used, there is a concern that the reinforcements inside the concrete might be damaged and therefore the strength of the concrete might be reduced, instead of being increased. A solution to this problem is using a drill bit having a small diameter of 10 mm or less to drill a large number of holes having depth of 80 mm or more so that the strength of the whole concrete skeleton remains unchanged. However, in the case where the drill bit having small diameter is used, since the strength of the shaft thereof is not enough, it will be difficult to bore a deep-hole.

To solve this problem, techniques for boring hole in the concrete are suggested, such as a hole boring machine dedicated to boring a hole in a concrete sleeper (see, for example, Japanese Patent Laid-Open Publication No. 2006-045832, Paragraphs 0018 to 0031, FIGS. 1 to 8 and others).

The hole boring machine is configured by mounting a vertically liftable motor drill on a frame of a track traveling carriage, in which a drill bit for boring a hole can be installed to a rotary shaft of the single motor drill via a hole boring core bit or an adapter. The hole boring machine has a slider table pivotally provided in a frame of a base, and a pillar for guiding the lifting motion of the motor drill is erected from the slider table. The position of the hole boring core bit or the drill bit for boring the hole installed to the tip end of the motor drill is adjusted by rotating the slider table, so that not only the positional alignment to the outside and inside of the rails can be performed, but also the slider table can be moved back and forth, left and right.

Further, the motor drill is mounted on the frame of the track traveling carriage in a manner that the motor drill can be vertically moved. The drill bit for boring the hole can be installed on the rotary shaft of the single motor drill via the hole boring core bit or the adapter.

When a drill having small diameter is used to drill a deep vertical hole or a deep inclined hole in a concrete floor, a tool guide mechanism having high rigidity is preferably used so that the drill bit can be reliably guided without shaking even if the drill has a long shaft. However, since the hole boring machine mounted on the embedded plug repairing carriage disclosed in Japanese Patent Laid-Open Publication No. 2006-045832 is dedicated to boring a vertical hole, it can not be used to drill an inclined hole. Also, since such a hole boring machine is moved by the carriage, it is not adequate to be used to perform building maintenance work.

SUMMARY OF THE INVENTION

Accordingly, it is a primary object of the present invention to provide a deep-hole boring machine having a tool guide mechanism capable of stably and reliably boring a vertical hole or an inclined hole with a small-diameter drill in a concrete floor in a construction site, as well as to provide a deep-hole boring guide device.

A deep-hole boring machine according to a first aspect of the present invention includes: a base to be detachably fixed to a concrete working face through a fixing means; a pillar tiltably supported by a supporting member through a pin to an upper face of the base; a fixing mechanism arranged on the base and for fixing the pillar at a desired angle; a guide member guided along the pillar; a rotary tool formed by a long shaft portion having a boring tool mounted to a tip end thereof; a rotation driving mechanism detachably fixed to the guide member and for rotationally driving the rotary tool; a rising/descending mechanism for moving the guide member along the pillar; a guide base supported by the base so as to be parallel to the working face; and a tool guide mechanism supported by the guide base and for guiding the shaft portion of the rotary tool in compliance with a tilt angle of the rotary tool.

A deep-hole boring machine according to a second aspect of the present invention is adapted to be fixed to a concrete working face for boring a hole having a depth-to-diameter ratio of 10 or higher, the deep-hole boring machine including: a base to be detachably fixed to the working face through a fixing means; a pillar tiltably supported by a supporting member arranged on the base 11 through a support shaft; a fixing mechanism for fixing the pillar at a predetermined tilt angle; a rotation driving mechanism for supporting and rotationally driving a rotary tool which is formed by detachably mounting a boring tool to a tip end of the shaft portion; a guide member for guiding the rotation driving mechanism along the pillar and supporting the rotation driving mechanism; a rising/descending mechanism for moving the guide member along the pillar; a guide base arranged on an extension line of the shaft portion supported by the rotation driving mechanism and detachably fixed to the working face through the fixing means; and a tool guide mechanism horizontally movable along a horizontal guiding face of the guide base and for guiding the shaft portion of the rotary tool in the boring direction in compliance with a tilt angle of the rotary tool.

With such a configuration, the deep-hole boring machine can be fixed to a concrete working face by arranging a base to the concrete working face. Further, the rotary tool is mounted to the rotation driving mechanism fixed to the guide member, the pillar is adjusted to a desired tilt angle and then fixed to that tilt angle, and the tilt angle of the shaft portion of the rotary tool is set. Further, the tool guide mechanism is horizontally moved along the guide base according to the tilt angle of the shaft portion so as to guide the shaft portion. Further, the hole boring work in the concrete floor is performed by actuating the rotation driving mechanism to rotate the rotary tool while lowering the guide member along the pillar by operating the rising/descending mechanism. While the deep-hole boring machine is performing the hole boring work, the shaft portion is guided by the tool guide mechanism in the boring direction. In the deep-hole boring machine, since the guide base is fixed to the working face by the fixing means in a manner independent from the base, both the base and the guide base have wide freedom in terms of fixing position.

Further, it is preferred that in the deep-hole boring machine, the guide base supported by the base, to which the pillar is tiltably mounted, and for supporting the tool guide mechanism is such arranged that the rotation center line of the pillar and the tilt center line of the tool guide mechanism extend parallel to each other but lie on different vertical planes.

With such a configuration, the base, to which the pillar is tiltably mounted, and the guide base which guides the tool guide mechanism are aligned in series, therefore not only the vertical deep-hole but also the inclined deep-hole can be bored.

Further, it is preferred that in the deep-hole boring machine, the guide base supported by the base, to which the pillar is tiltably mounted, and for supporting the tool guide mechanism is such arranged that the rotation center line of the pillar and the tilt center line of the tool guide mechanism lie on the same plane.

With such a configuration, the base, to which the pillar is tiltably mounted, and the guide base which guides the tool guide mechanism are arranged in parallel with each other, since the rotary tool supported by the rotation driving mechanism and the tool guide mechanism engaged to the guide base can be brought closer to each other, the rigidity of the shaft portion can be improved, and boring feed can be increased.

In the aforesaid deep-hole boring machine, the tool guide mechanism includes a guide bush for rotatably supporting the shaft portion, a tool guide base for detachably fixing the guide bush and tiltably supported by the guide base at a tilt angle of the pillar, and a guide fixing means for fixing the tool guide base at a predetermined tilt angle.

With such a configuration, the guide bush for rotatably supporting the shaft portion is tilted, in a state where it is fixed to the guide base, so as to have the same tilt angle as the shaft portion, and then the tilted guide base is fixed by the guide fixing means so that the shaft portion can be guided near the working face.

It is preferred that in the aforesaid deep-hole boring machine, the tool guide mechanism is horizontally movable along a guide face of the guide base and includes: a tool guide base having a through-hole formed in the center portion thereof; a spherical guide member fitted into the through-hole of the tool guide base; a spherical bearing tiltably fitted into a spherical surface portion of the spherical guide member and having a through-hole formed in the center portion thereof; a tool guide member fitted into the through-hole of the spherical bearing and having a bush hole formed in the center portion thereof; a guide bush detachably fitted into a bush hole of the tool guide member and for guiding a shaft portion of the rotary tool; and a fixture for fixing the guide bush to the tool guide member.

With such a configuration, in the deep-hole boring machine, the guide bush is previously fitted onto the shaft portion of the rotary tool, and the tilt angle of the tool guide member is adjusted by the spherical guide member and the spherical bearing, and then the tool guide member is fixed by a fixing bolt at that tilt angle. Further, the guide bush fitted onto the shaft portion is fitted into the bush hole of the tool guide member and fixed by the fixture. Incidentally, the tilt angle of the tool guide member also can be adjusted in a state where the guide bush, into which the shaft portion is fitted, is fitted into the tool guide member.

It is preferred that in the aforesaid deep-hole boring machine, the tool guide mechanism is horizontally movable along a guide face of the guide base and includes: a tool guide base having a through-hole formed in the center portion thereof; a tool guide member pivotally supported to the through-hole of the tool guide base by a pair of guide pins and having a bush hole formed at the center thereof; a fixing bolt for fixing the tool guide member at a predetermined tilting angle; a guide bush detachably fitted into a bush hole of the tool guide member and having a guide hole formed therein for guiding a shaft portion of the rotary tool; and a fixture for fixing the guide bush to the tool guide member.

With such a configuration, the guide bush is previously fitted onto the shaft portion of the rotary tool, the tilt angle of the tool guide member is adjusted by the guide pins, and then the tool guide member is fixed by the fixing bolt at that tilt angle. Further, the guide bush fitted onto the shaft portion is fitted into the bush hole of the tool guide member and fixed by the fixture. Incidentally, the tilt angle of the tool guide member also can be adjusted in a state where the guide bush, into which the shaft portion is fitted, is fitted into the tool guide member.

It is preferred that the aforesaid deep-hole boring machine, further includes a water supply-discharge device which supplies cooling water to the tip end of the rotary tool through the rotary tool held by a tool holder of the rotation driving mechanism, and discharges the used cooling water from the tool guide base of the tool guide mechanism to the water supply-discharge device, so that the cooling water can be used in a circular manner.

With such a configuration, the cooling water is supplied by the water supply-discharge device from the water supply chamber arranged in the rotation driving section to the tip end of the rotary tool through the rotary tool, and the used cooling water mixed with concrete powder is discharged from the tool guide base of the tool guide mechanism. Thus, the boring work can be performed without replenishing new cooling water, and the working site is prevented from being soiled.

It is preferred that in the aforesaid deep-hole boring machine, the guide member has a supporting recessed portion for supporting a water supply mechanism supplying cooling water to the boring tool, the supporting recessed portion communicating with a through-hole formed in the rotary tool in its axial direction; a shaft part of a tool holder for rotatably holding the rotary tool to the rotation driving mechanism penetrates the water supply mechanism; the water supply mechanism includes a cylindrical body supported by the supporting recessed portion; a first oil seal and a second oil seal spaced apart from each other inside the cylindrical body so as to form a cooling water supply space, the first oil seal and second oil seal being arranged in a manner that allow the shaft part of the tool holder to rotate; and a hose connection portion for supplying the cooling water to the cooling water supply space formed by the first oil seal and second oil seal from a side face of the cylindrical body through a water supply hose; and the shaft part of the tool holder has a communication hole formed in the side face thereof corresponding to the supply space to communicate with the through-hole.

With such a configuration, when the cooling water is supplied from the water supply hose, the cooling water is received by the cooling water supply space defined by the first oil seal, second oil seal and the side face of the cylindrical body. Thus, the cooling water supplied to the supply space of the water supply chamber is supplied to the boring tool through a through-hole of the rotary tool from the communication hole formed in the shaft part of the tool holder penetrating the water supply mechanism.

It is preferred that in the aforesaid deep-hole boring machine, the tool holder includes a first connecting member having one end thereof detachably connected to the driving shaft of the rotation driving mechanism and a second connecting member having one end thereof detachably connected to the first connecting member and the other end thereof detachably connected to the shaft portion; a communication hole is formed in a side face of either the one end of second connecting member or the other end of the first connecting member as the shaft part; the first connecting member is rotatably supported through a first bearing disposed between the first oil seal and one end of the cylindrical body, and the second connecting member is rotatably supported through a first bearing disposed between the second oil seal and the other end of the cylindrical body.

With such a configuration, the first connecting member of the tool holder is arranged the one end of the cylindrical body through the first oil seal and the first bearing, the second connecting member of the tool holder is arranged on the other end of the cylindrical body through the second oil seal and the second bearing, and the one end of second connecting member or the other end of the first connecting member are screwed to each other as the shaft part. Thus, the shaft part of the tool holder is rotatably mounted to penetrate the water supply mechanism in a liquid-tight manner, and therefore the cooling water can be supplied to the communication hole formed in the side face of either the first connecting member or the second connecting member as the shaft part of the tool holder disposed in the supply space where the cooling water is supplied.

It is preferred that in the aforesaid deep-hole boring machine, the pillar includes a base pillar, a rotary pillar and an engaging mechanism, the rotary pillar being connected to an upper portion of the base pillar by a connector and capable of rotating about the axis of the pillar for a predetermined angle, the engaging mechanism being provided at a lower end of the rotary pillar and an upper end of the base pillar for engaging the rotary pillar and the base pillar with each other so that the rotary pillar can rotate about the axis of the pillar.

With such a configuration, the rotary pillar is rotated by a predetermined angle in a state where the guide member is moved to the position of the rotary pillar by the rising/descending mechanism and where the shaft portion is detached from the rotation driving mechanism supported by the guide member. Further, the rotary pillar is rotated to its original position again in a state where the rotary tool having a long shaft portion remains inserted in the deep-hole, so that the rotary tool can be connected to the tool holder, the rotary tool having a long shaft portion can be smoothly pulled out from the deep-hole, and the rotary tool having a long shaft portion can be smoothly connected to the tool holder.

A deep-hole boring guide device according to a third aspect of the present invention is adapted to be fixed to a concrete working face for boring a hole having a depth-to-diameter ratio of 10 or higher, the deep-hole boring guide device including: a base to be detachably fixed to the working face through a fixing means; a pillar tiltably supported by a supporting member arranged on the base through a support shaft; a fixing mechanism for fixing the pillar at a predetermined tilt angle; a guide member for guiding a rotation driving mechanism, which supports and rotationally drives a rotary tool which is formed by detachably mounting a boring tool to a tip end of the shaft portion, along the pillar and supporting the rotation driving mechanism; a rising/descending mechanism for moving the guide member along the pillar; a guide base arranged on an extension line of the shaft portion supported by the base and fixed to the working face; and a tool guide mechanism horizontally movable along a horizontal guiding face of the guide base and for guiding the shaft portion of the rotary tool in the boring direction in compliance with a tilt angle of the rotary tool.

A deep-hole boring guide device according to a fourth aspect of the present invention is adapted to be fixed to a concrete working face for boring a hole having a depth-to-diameter ratio of 10 or higher, the deep-hole boring guide device including: a base to be detachably fixed to the working face through a fixing means; a pillar tiltably supported by a supporting member arranged on the base through a support shaft; a fixing mechanism for fixing the pillar at a predetermined tilt angle; a guide member for guiding a rotation driving mechanism, which supports and rotationally drives a rotary tool which is formed by detachably mounting a boring tool to a tip end of the shaft portion, along the pillar and supporting the rotation driving mechanism; a rising/descending mechanism for moving the guide member along the pillar; a guide base arranged on an extension line of the shaft portion supported by the rotation driving mechanism and detachably fixed to the working face through the fixing means; and a tool guide mechanism horizontally movable along a horizontal guiding face of the guide base and for guiding the shaft portion of the rotary tool in the boring direction in compliance with a tilt angle of the rotary tool.

In such a deep-hole boring guide device, the rotation driving mechanism is held by the guide member, and the vertical deep-hole and the inclined deep-hole can be bored while the rotary tool being guided near the working face.

DETAILED DESCRIPTION OF PREFERRED EMBODIMENT(S)

Figure 1:
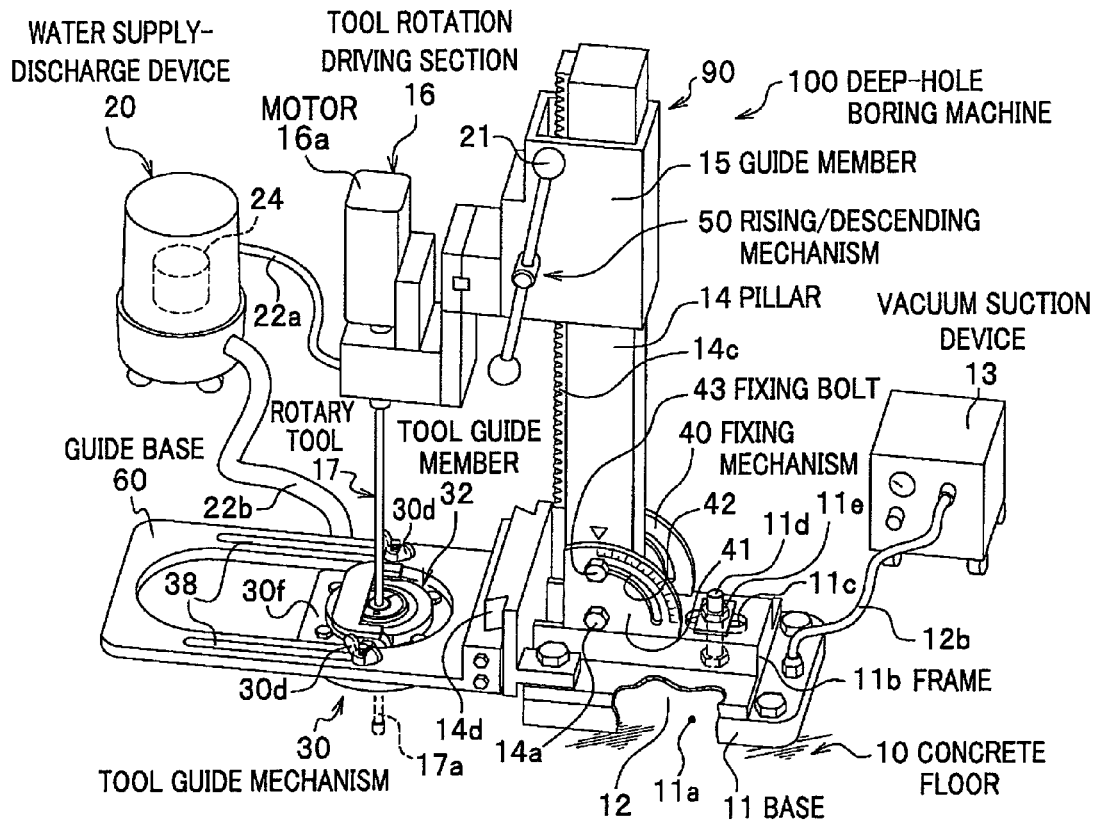
FIG. 1 is a perspective view showing an entire constitution of a deep-hole boring machine according to a first embodiment of the present invention, when the machine is poised to bore a vertical hole.
Figure 2:
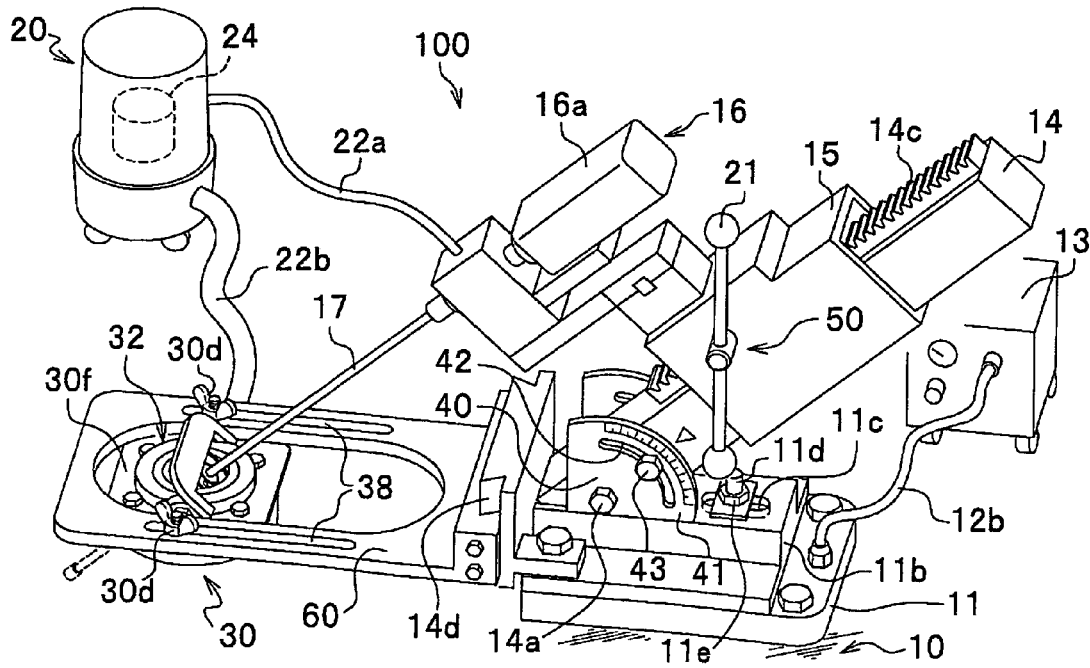
FIG. 2 is a perspective view showing an entire constitution of the deep-hole boring machine according to the first embodiment, when the machine is poised to bore an inclined hole.
Figure 3:
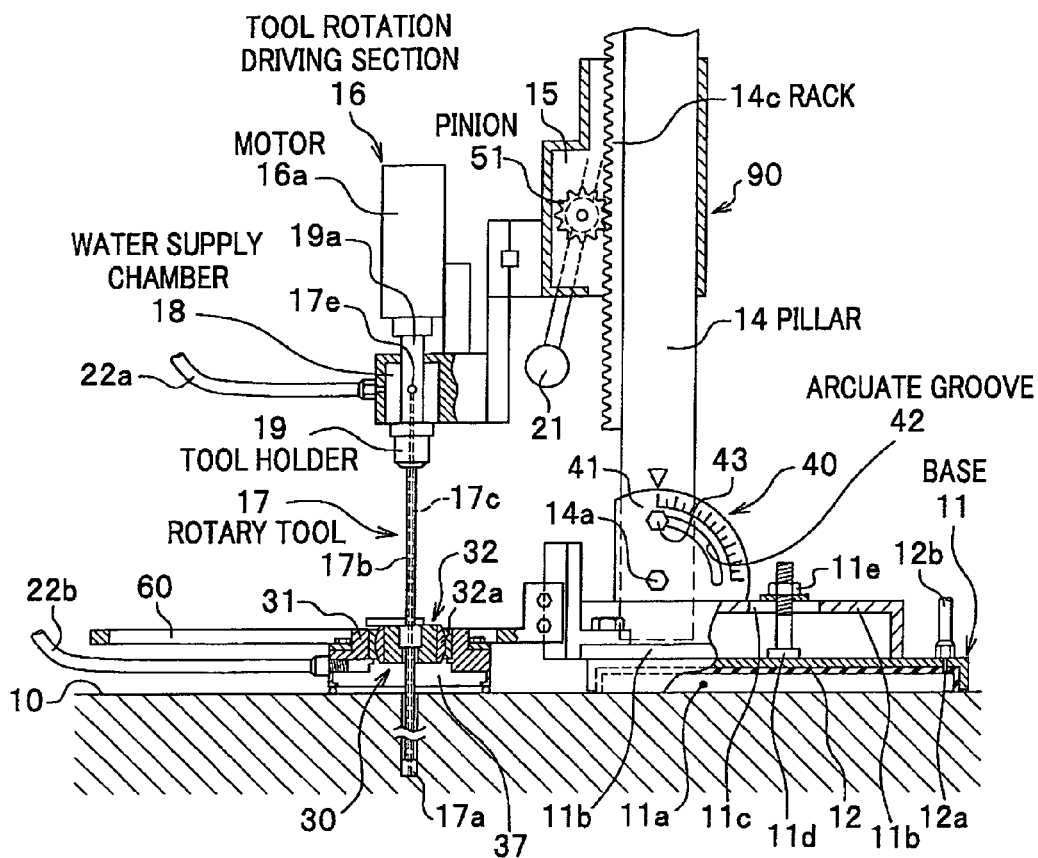
FIG. 3 is a longitudinal section showing an entire constitution of the deep-hole boring machine according to the first embodiment, when the machine is poised to bore a vertical hole.
Figure 4:
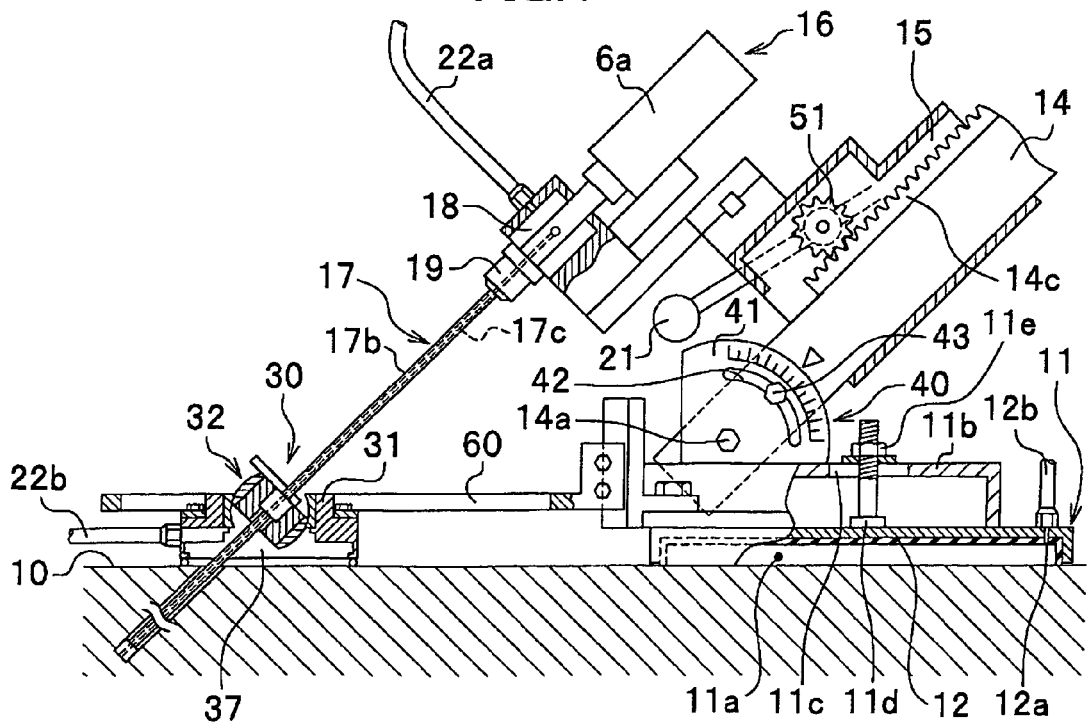
FIG. 4 is a longitudinal section showing an entire constitution of the deep-hole boring machine according to the first embodiment, when the machine is poised to bore an inclined hole.

The best mode for carrying out the present invention will be described below with reference to attached drawings. FIG. 1 is a perspective view showing an entire constitution of a deep-hole boring machine, when the machine is poised to bore a vertical hole; FIG. 2 is a perspective view showing an entire constitution of the deep-hole boring machine, when the machine is poised to bore an inclined hole; FIG. 3 is a longitudinal section showing an entire constitution of the deep-hole boring machine, when the machine is poised to bore a vertical hole; and FIG. 4 is a longitudinal section showing an entire constitution of the deep-hole boring machine, when the machine is poised to bore an inclined hole.

First Embodiment

As shown in FIGS. 1 and 2, the deep-hole boring machine 100 includes a base 11 disposed above the concrete floor (the working face), a pillar 14, a fixing mechanism 40, a guide member 15, a tool rotation driving section (rotation driving mechanism) 16 for mounting a rotary tool 17, a rising/descending mechanism 50, a guide base 60, and a tool guide mechanism 30. Note that the deep-hole boring guide device 90 referred in this description means the deep-hole boring guide device with the tool rotation driving section 16 detached from the guide member 15.

As shown in FIGS. 1 and 3, the base 11 includes a recessed portion 11a formed on a bottom face thereof, a frame 11b mounted above the recessed portion 11a, and an elastically deformable vacuum pad 12 arranged to surround the recessed portion 11a. Further, the recessed portion 11a communicates with a vacuum suction device 13 through a flexible hose 12b whose both ends respectively connect a communication hole 12a and the vacuum suction device 13. Thus, the base 11 can come into close contact with an object to be bored with air-tightness even if the object to be bored has an uneven surface, such as a concrete surface. Further, a fixing bolt 11d is erected from substantially the center of an upper face of the recessed portion 11a.

The frame 11b has a fixing mechanism 40 integrated therewith. The fixing mechanism 40 pivotally supports a lower end portion of the pillar 14 to an upper surface of the frame 11b so that the pillar 14 is tiltably supported. The frame 11b is mounted on the recessed portion 11a so as to be movable relative to the recessed portion 11a. That is, the frame 11b has a long hole 11c formed at a position corresponding to the fixing bolt 11d erected from the recessed portion 11a, and when the fixing bolt 11d engages with the long hole 11c, the frame 11b can be moved against the recessed portion 11a along the long hole 11c. Further, the recessed portion 11a and the frame 11b are fixed to each other by fastening a nut 11e onto the fixing bolt 11d. Thus, although not shown in the drawings, in the case where there are cracks on the surface of the concrete and therefore the vacuum suction device 13 can not be used, an anchor bolt can be previously plunged in the concrete and, in the state where the recessed portion 11a is detached, a nut can be fastened onto the anchor bolt inserted through the long hole 11c of the frame 11b so that the frame 11b can be fixed as the base 11. Thus, in the case where the recessed portion 11a is not used, the frame 11b and the long hole 11c serve as a fixing means for fixing the machine to the anchor bolt.

The fixing mechanism 40 includes a pair of angle indexing plates 41, 41 and a fixing bolt 43 disposed in two arcuate grooves 42 respectively formed in the pair of angle indexing plates 41, 41.

The pillar 14 is disposed between the pair of angle indexing plates 41, 41 provided above the frame 11b, and is pivotally supported by the pin (support shaft) 14a across the pair of angle indexing plates 41, 41, so that the pillar 14 can be tilted to a predetermined tilt angle. Further, the pillar 14 is fixed at the predetermined tilt angle by the fixing bolt 43. The pillar 14 is metallic quadrangular hollow pillar. The pillar 14 has a rack 14c (which constitutes a part of the rising/descending mechanism 50) formed on one side face thereof so that the guide member 15 (on which a below-described tool rotation driving section 16 is mounted) can be slid (moved) against the rack 14c.

As shown in FIGS. 3 and 4, provided inside the guide member 15 is a pinion 51 (which constitutes a part of the rising/descending mechanism 50) meshing with the rack 14c arranged on the pillar 14. Incidentally, the rising/descending mechanism 50 includes the rack 14c arranged on the pillar 14, the pinion 51 meshing with the rack 14c, and a handle 21 for operating the pinion 51.

The guide member 15 includes a space for housing the pinion 51, a casing portion formed in such a manner that the casing portion can slide against faces of the pillar 14 other than the face having the rack 14c, and an installation portion for detachably installing the tool rotation driving section 16 to the casing portion so that the casing portion intimately contact the tool rotation driving section 16. Further, as shown in FIGS. 1 to 4, a water supply chamber 18 of a water supply-discharge device 20 (which will be described later) can be disposed at a predetermined position where the tool rotation driving section 16 is supported by the guide member 15. Incidentally, a wing bolt (not shown) is screwed into the guide member 15 to press the pillar 14 so that the pillar 14 can be fixed against the guide member 15.

The tool rotation driving section 16 includes a motor 16a, a driving shaft 19a continuous with a rotary shaft of the motor 16a, and a tool holder 19 arranged at the tip end of the driving shaft 19a. The driving shaft 19a is provided with a water supply hole 17e which penetrates the side face of the driving shaft 19a. The portion of the driving shaft 19a having the hole 17e formed thereinside is located inside the water supply chamber 18.

The rotary tool 17 includes a shaft (shaft portion) 17b held by the tool holder 19, and a boring tool 17a detachably mounted to a tip end of the shaft 17b. Incidentally, the shaft 17b of the rotary tool 17 has a screw formed at the tip end thereof to allow the boring tool 17a to be screwed into the shaft 17b, so that the boring tool 17a can be changed according to necessity. The boring tool 17a can be, for example, a diamond core bit, a long drill made of brazed superhard metal or the like.

Further, the rotary tool 17 is formed with a through-hole 17c for guiding the cooling water to the tip end of the rotary tool 17. The cooling water from the below-described water supply-discharge device 20 is pumped by a pump 24 provided inside the water supply-discharge device 20 to the tip end of the rotary tool 17 through a water supply hose 22a, the water supply chamber 18, the hole 17e (see FIG. 3) provided on the side face of the driving shaft 19a, and the through-hole 17c.

As shown in FIGS. 1 and 2, the guide base 60 can be vertically moved along a dovetail groove 14d provided to the base 11. The guide base 60 is provided, at the center thereof, with a tool guide mechanism 30 which can be horizontally moved along a horizontal guide face (which is parallel to the working face) of the guide base 60. Further, as shown in FIG. 3, the tool guide mechanism 30 projects downward from the guide base 60 so that a lower end thereof comes into contact with the upper surface of the floor. Incidentally, since the guide base 60 can be vertically moved along the dovetail groove 14d, the boring work can be performed even if there is a step on the surface to be bored.

Figure 7:
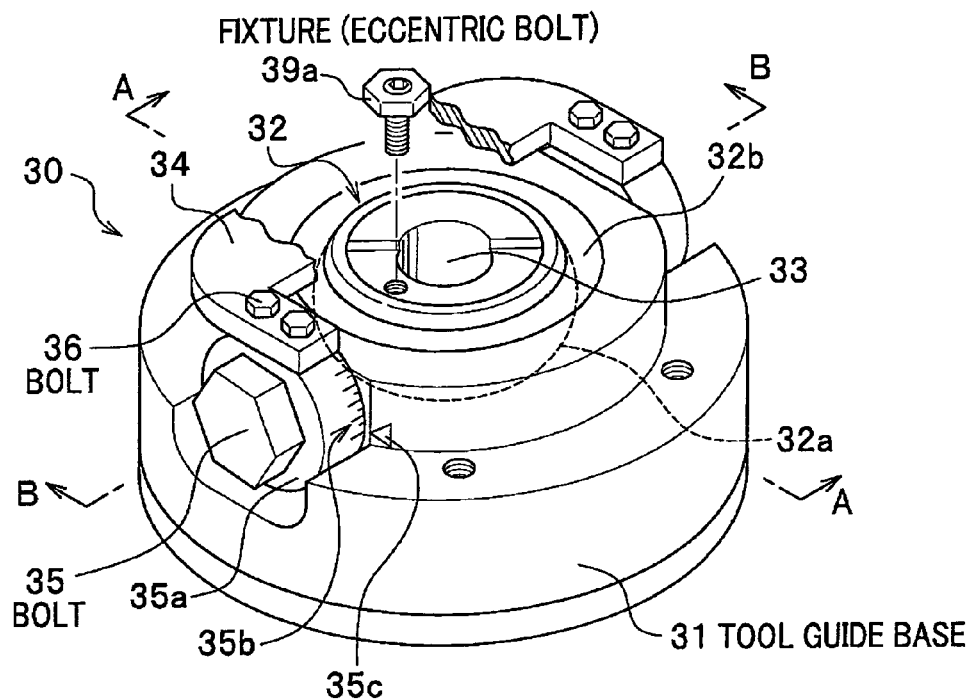
FIG. 7 is a perspective view showing the tool guide mechanism of the deep-hole boring machine according to the first embodiment and the second embodiment.
Figure 8:
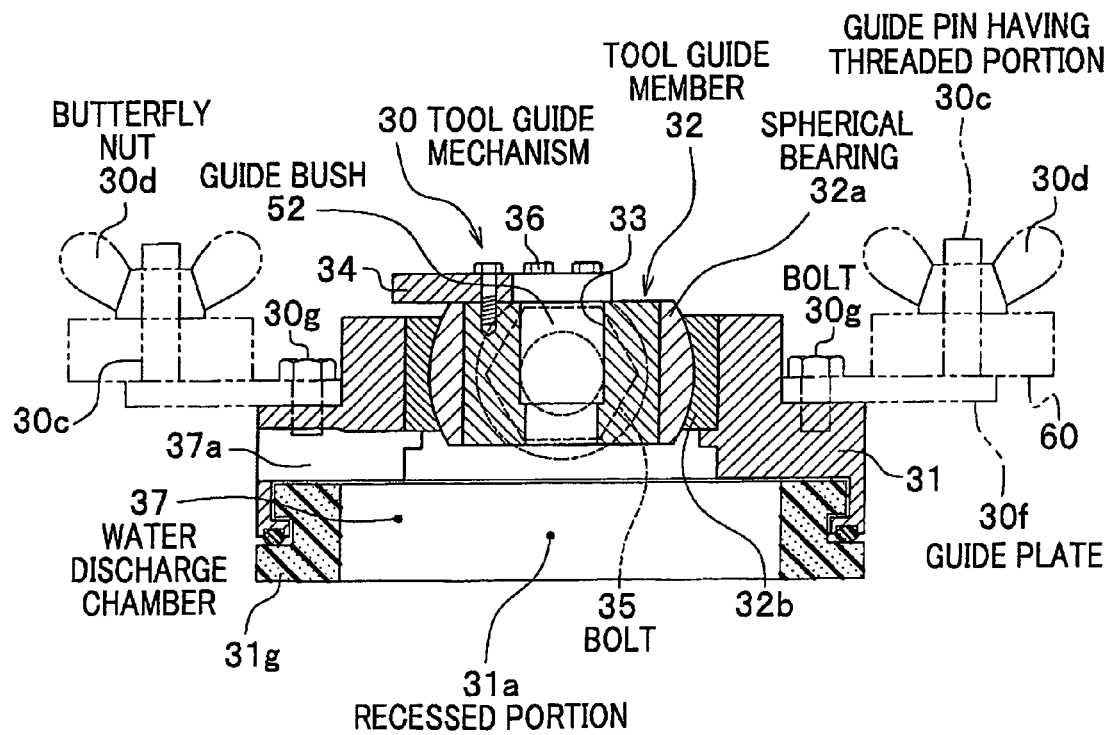
FIG. 8 is a longitudinal section taken along line A-A of FIG. 7 showing the tool guide mechanism of the deep-hole boring machine according to the first embodiment and the second embodiment.

As shown in FIGS. 1, 7 and 8, the tool guide mechanism 30 is provided with two guide pins 30c, 30c each having a male screw threaded portion. The guide pins 30c, 30c are respectively guided along two linear guide grooves 38, 38 formed at both end sides of the guide base 60, and the tool guide mechanism 30 is fixed to the guide base 60 by fastening two butterfly nuts 30d, 30d to the guide pins 30c, 30c.

Further, the tool guide mechanism 30 includes a tool guide base 31, a spherical guide member 32b (see FIG. 8) fitted to the tool guide base 31, a spherical bearing 32a fitted in the spherical surface portion of the spherical guide member 32b so as to be tiltable, a tool guide member 32 fitted into the spherical bearing 32a and having a bush hole 33 formed in the center portion thereof, a guide bush 52 detachably attached to the bush hole 33 of the tool guide member 32 and guiding the shaft 17b of the rotary tool 17, and a fixture 39a for fixing the guide bush 52. The tool guide mechanism 30 rotatably supports the shaft 17b of the rotary tool 17 near the concrete floor 10, so that the shaft 17b is guided in the boring direction.

The tool guide base 31 has a recessed portion 31a formed in the center portion thereof (see FIG. 8). Thus, the dirty water mixed with concrete powder generated when performing the boring work is temporarily pooled in a water discharge chamber 37 defined by the recessed portion 31a and then returned to the water supply-discharge device 20 through a water discharge hose 22b. The returned dirty water is used again as the cooling water after being filtered by a filter provided inside the water supply-discharge device 20.

Figure 6:
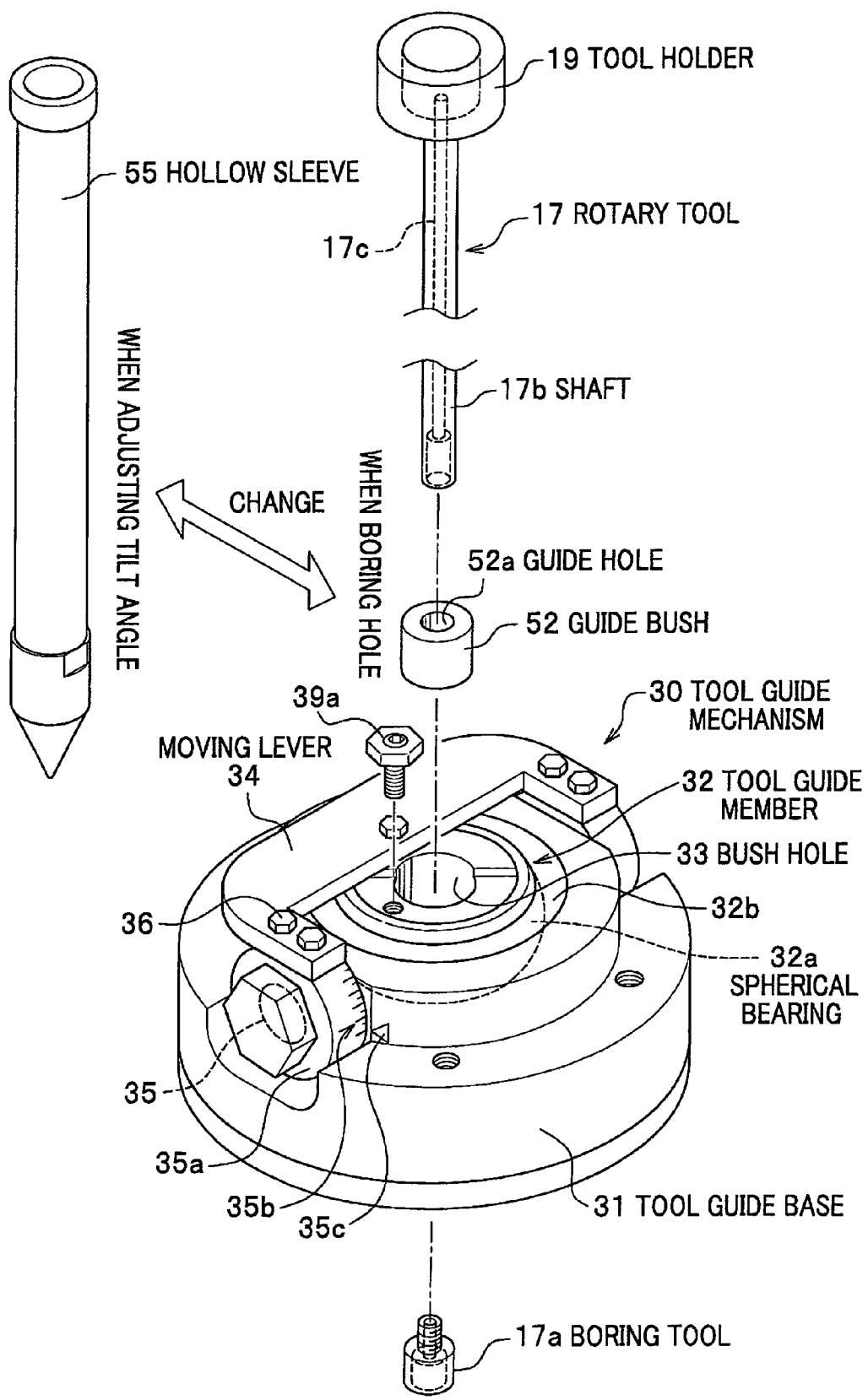
FIG. 6 is a perspective view showing an entire constitution of a tool guide mechanism of the deep-hole boring machine according to the first embodiment and a second embodiment of the present invention.

As shown in FIG. 6, the tool guide base 31 is provided, at the center thereof, with the spherical guide member 32b for tiltably supporting the spherical bearing 32a rotatably fitted in the spherical surface portion of the spherical guide member 32b. Further, the spherical bearing 32a fits and supports the tool guide member 32 having the bush hole 33 formed at the center thereof. The guide bush 52 having a guide hole 52a, which guides the shaft 17b of the rotary tool 17, formed therein is detachably inserted into the bush hole 33 of the tool guide member 32. Further, the guide bush 52 is pressed by the fixture 39a from the side face (the upper face) so as to be fixed to the tool guide member 32. The fixture 39a is, for example, an eccentric bolt whose head is deviated from the center when being tightened, so that the guide bush 52 is pressed from the side face.

Figure 9:
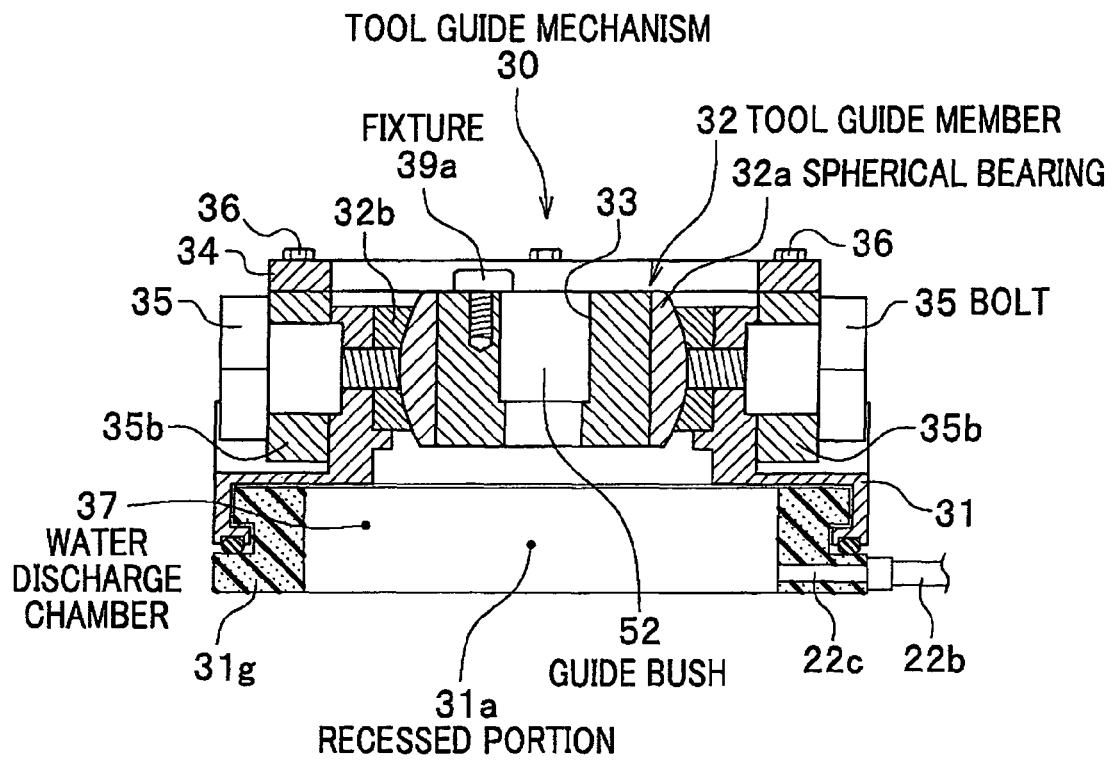
FIG. 9 is a longitudinal section taken along line B-B of FIG. 7 showing the tool guide mechanism of the deep-hole boring machine according to the first embodiment and the second embodiment.

Further, as shown in FIGS. 7, 8 and 9, the tool guide member 32 here is formed by the concentrically arranged annular members. Specifically, the spherical guide member 32b, the spherical bearing 32a and the guide bush 52 are arranged in this order from the outside toward the inside of the through-hole formed at the center of the tool guide member 32. The spherical bearing 32a is pivotally supported by the bolts 35, 35 from the right and left so as to be tiltable. Further, rings 35a, 35a surrounding the bolt 35, 35 are provided. The rings 35a, 35a each has a scale 35b formed on a peripheral surface thereof. A moving lever 34 is mounted to bridge the upper face of the rings 35a, 35a through a bolt 36.

With such a configuration, the spherical bearing 32a can be fixed at a desired tilt angle due to being pressed by the bolts 35, 35. The tool guide mechanism 30 can be horizontally moved or the tilt angle of the spherical bearing 32a can be adjusted by lifting the moving lever 34 by hand. The tilt angle of the spherical bearing 32a can be adjusted by loosening the bolt 35 and then lifting the moving lever 34 to point the scale 35b formed in the ring 35a to the pointer 35c. After the tool guide member 32 is set to a predetermined tilt angle, the tool guide member 32 is fixed to the tool guide base 31 by the bolt 35 at the set tilt angle.

Incidentally, it is preferred that the bolt 35 be arranged at such a position where the bolt 35 can be operated from the outside no matter what position the tool guide base 31 is moved to along the linear guide grooves 38, 38 of the guide base 60.

As shown in FIG. 8, a guide plate 30f is mounted on a cylindrical portion of the tool guide base 31. The guide plate 30f and the tool guide base 31 are brought into close contact with each other by four bolts 30g. Two threaded guide pins 30c are fixed on the upper face of the guide plate 30f respectively on the right side and left side. As shown in FIGS. 1 and 2, the two guide pins 30c, 30c each having a male screw threaded portion are respectively inserted into the linear guide grooves 38, 38 of the guide base 60 so as to be linearly guided. The guide plate 30f attached to the tool guide base 31 can be fixed to the guide base 60 by tightly fastening the butterfly nuts 30d, 30d.

As shown in FIGS. 8 and 9, the tool guide base 31 includes the recessed portion 31a formed on the bottom face thereof, and an elastically deformable ring-shaped sponge 31g disposed to surround the recessed portion 31a. Further, the recessed portion 31a is connected to the water supply-discharge device 20 through the communication hole 22c penetrating the tool guide base 31 and the water discharge hose 22*b*, which is a flexible hose. Thus, the tool guide base 31 can come into close contact with an object to be bored with air-tightness even if the object to be bored has an uneven surface, such as a concrete surface.

After the tool guide member 32 is set to a predetermined tilt angle, the tool guide member 32 is fixed to the tool guide base 31 at the set tilt angle by the bolt 35. Incidentally, it is preferred that the bolt 35 be arranged at such a position where the bolt 35 can be operated from the outside no matter what position the tool guide base 31 is moved to along the linear guide grooves 38, 38 of the guide base 60.

Further, the guide bush 52 has a guide hole 52*a* formed at the center thereof for fitting the shaft 17*b* of the rotary tool 17 into the guide bush 52. Since the diameter of the rotary tool 17 is larger than that of the guide hole 52*a*, the shaft 17*b* is fitted into the guide bush 52 in a state where the boring tool 17*a* is detached, and then the guide bush 52 with the shaft 17*b* fitted therein is fitted into the bush hole 33 of the tool guide member 32. Then the guide bush 52 attached to the tool guide member 32 is fixed by being pressed by the fixture (eccentric bolt) 39*a*. Since the fixture 39*a* is attached on the upper face of the tool guide member 32, the guide bush 52 is fixed by pressing the side face of the guide bush 52 with a portion of the fixture 39*a*. Incidentally, the diameter of the boring tool 17*a* is smaller than that of the guide hole 52*a*.

The tilt angle can be set by the tool guide member 32 only, or be set by the tool guide member 32 in conjunction with the rotary tool 17. In the case where the tilt angle is set by the tool guide member 32 only, the tilt angle is set by the steps of: moving the tool guide member 32 via the moving lever 34 along the guide base 60 to a predetermined position, pointing the scale 35*b* of the ring 35*a* to the pointer 35*c* to set the tilt angle to a predetermined value, and fastening the bolt 35.

In the case where the tilt angle is set by the tool guide member 32 in conjunction with the rotary tool 17, the tilt angle is set by the following steps. Specifically, the tilt angle is set by operating the pillar 14 (see FIG. 2) in a state where the shaft 17*b* is fitted into the guide bush 52. At this time, in the case where the diameter of the shaft 17*b* is small and therefore there is concern that the shaft 17*b* might be bent and broken, a hollow sleeve 55 (see FIG. 6) can be mounted to the tool rotation driving section 16, and the tool guide member 32 is moved along the guide base 60 (see FIG. 1) in a state where an end portion of the hollow sleeve 55 is inserted into the bush hole 33 of the tool guide member 32. Then the tilt angle is set to the predetermined value by tilting the pillar 14 which tilts in conjunction with the hollow sleeve 55. Then, when the tool guide member 32 is fixed by the bolt 35 after the tool guide member 32 is moved to the predetermined position and the tilt angle is set to the predetermined value, the hollow sleeve 55 is detached from the tool rotation driving section 16, and the guide bush 52 is amounted instead. Incidentally, the tip end of the hollow sleeve 55 is sharpened so as to be easily inserted into the bush hole 33.

When boring a hole inclined to the concrete floor 10, the hollow sleeve 55 is preferably used to determine the position of the deep-hole in the concrete floor 10. Specifically, in a state where the guide base 60 is detached from the base 11, the hollow sleeve 55 is mounted to the tool rotation driving section 16, and the pillar 14 is fixed to the predetermined tilt angle. Further, the boring position (namely, the position where the tip end of the hollow sleeve 55 comes into contact with the concrete floor 10) is determined by operating the handle 21 (see FIG. 4) under the visual observation of the operator. At this time, the nut 11*e* (see FIG. 4) of the base 11 is loosened to adjust the position of the frame 11*b* so as to set the position of the guide base 60 mounted on the base 11. Then, after the guide base 60 is mounted to the base 11, the tip end of the hollow sleeve 55 is inserted into the bush hole 33, and the position and the angle of the tool guide member 32 of the guide base 60 is set as the center of the hole to be bored.

As shown in FIGS. 1 to 4, the cooling water is supplied from the water supply-discharge device 20 to the rotary tool 17 through the water supply hose 22*a* and the water supply chamber 18, and the dirty water accumulated in the water discharge chamber 37 of the tool guide base 31 is returned, through the water discharge hose 22*b*, to the water supply-discharge device 20 where the dirty water is filtered and then circulated as the cooling water. The water supply-discharge device 20 includes a pump 24 disposed inside the main body thereof and a filtering mechanism such as a filter (not shown). Thus, it becomes possible to supply the cooling water and filter the dirty water without wetting the working site. Incidentally, the water supply-discharge device 20 not only supplies the cooling water to the water supply chamber 18, but also forcibly sucks the dirty water from the water discharge chamber 37. Thus, the cooling water from the water supply-discharge device 20 is circulated through the route of: the water supply hose 22*a*, the water supply chamber 18, the hole 17*e*, the through-hole 17*c* of the rotary tool 17, the boring tool 17*a*, the deep-hole being bored, the water discharge chamber 37 and the water discharge hose 22*b*. The concrete powder generated by the boring tool 17*a* is mixed into the cooling water. The dirty water mixed with the concrete powder is sucked from the deep-hole up to the water discharge chamber 37 and discharged, through the water discharge hose 22*b*, to the water supply-discharge device 20 where the dirty water is filtered by the filter (not shown).

Incidentally, the base 11, which rotatably supports the pillar 14, and the guide base 60, which guides (supports) the tool guide mechanism 30, are arranged in such a manner that, when the deep-hole boring machine 100 is poised to bore a vertical hole, the rotation center line of the pillar 14 and the tilt center line of the tool guide mechanism 30 extend parallel to each other but lie on different vertical planes.

The tool guide mechanism 30 is supported by the base 11 so as to be parallel to the upper face of the concrete floor 10 and is horizontally movable along a guide face of the guide base 60. The tool guide mechanism 30 supports the shaft 17*b* of the rotary tool 17 at a tilt angle of the rotary tool.

Figure 12A:
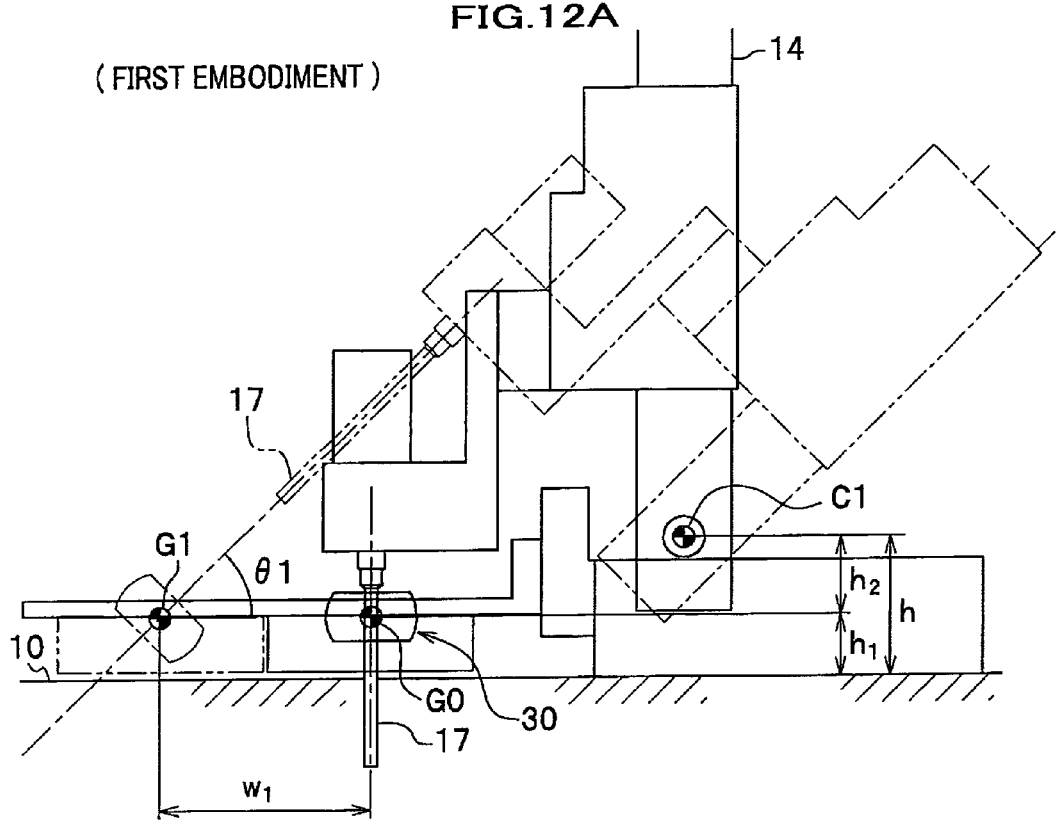
FIG. 12A is an illustration showing the relationship between the tilt angle of a rotary tool and the tilt angle of the tool guide member according to the first embodiment.

FIG. 12A shows the relationship between the tilt angle of rotary tool 17 and the tilt angle of the tool guide member 32 of the tool guide mechanism 30 according to the present embodiment.

If the distance between the upper face of the concrete floor 10 and the rotation center C1 of the pillar 14 is defined as h, the distance between the upper face of the concrete floor 10 and the tilt center G1 of the tool guide mechanism 30 is defined as h1, and the tilt angle is defined as θ1, then the displacement of the rotary tool 17 relative to the center line of the rotary tool 17 in horizontal direction is w1 When the tilt angle θ1 becomes 45 degrees, the displacement w1 will become a value proportional to "h-h1", so that the inclined hole can be bored at the displacement w1 ranging from the tilt center G0 to the tilt center G1 of the tool guide mechanism 30.

The operating method of the deep-hole boring machine 100 will be described below. Note that the operation method of the present embodiment is not limited to the below description but can be appropriately changed.

<Steps for Boring Vertical Hole> (see FIGS. 1, 3 and 6)

(1) Temporarily placing the deep-hole boring machine 100 so that the tip end of the tool is aligned with a predetermined boring position on the concrete floor 10.

(2) Actuating the vacuum suction device 13 to fit the base 11 onto the concrete floor 10.

(3) Loosening the fixing bolt 11d arranged in the frame 11b of the base 11 to move the frame 11b to adjust the position of the tip end of the tool.

(4) Performing centering of the tool guide mechanism 30 at the predetermined boring position using the hollow sleeve 55.

(5) Fixing the tool guide mechanism 30 with the butterfly nuts 30d, 30d.

(6) Mounting the rotary tool 17 in replacing the hollow sleeve 55.

(7) Detaching the boring tool 17a from the tip end of the shaft 17b, and attaching the boring tool 17a to the shaft 17b again in a state where the shaft 17b is passed through the guide bush 52.

(8) Operating the handle 21 to move the rotary tool 17 so that the rotary tool 17 is located right above the tool guide member 32, inserting the guide bush 52 into the bush hole 33 of the tool guide member 32, and fixing the guide bush 52 with the fixture (eccentric bolt) 39a.

(9) Driving the motor 16a of the tool rotation driving section 16 to rotate the rotary tool 17.

(10) Actuating the pump 24 of the water supply-discharge device 20 to supply the cooling water to the rotary tool 17.

(11) The cooling water is fed to the water supply chamber 18 from the water supply hose 22a by the pump 24, and the cooling water fed to the water supply chamber 18 is supplied to the working position through the route of: the hole 17e of the driving shaft 19a, the through-hole 17c and boring tool 17a.

(12) Operating the handle 21 to advance the boring tool 17a.

(13) Changing the rotary tool 17 having different length according to necessity so that the rotary tool 17 can be advanced to a predetermined depth.

At this time, the dirty water mixed with concrete powder generated when boring the hole with the boring tool 17a is pumped by the pump 24 of the water supply-discharge device 20 into the water supply-discharge device 20 again from the water discharge chamber 37 of the tool guide base 31 through the water discharge hose 22b. The dirty water returned to the water supply-discharge device 20 is filtered by the filter so as to be used as the cooling water.

Further, since the shaft 17b is guided by the guide bush 52 when the boring tool 17a is boring the deep-hole in the concrete floor 10, the boring tool 17a can stably perform boring work without shaking. When the rotary tool 17 is advanced to a predetermined depth, the supply of the cooling water is stopped, and the rotary tool 17 is pulled back to its original position from the concrete floor 10, which ends the boring work.

Steps for boring a vertical hole will be described below.

<Steps for Boring Inclined Hole> (see FIGS. 2, 4, 5A, 5B, 5C, 5D and 6)

(1) Tilting the pillar 14 to a predetermined angle and fastening the fixing bolt 43 to fix the pillar 14 onto the angle indexing plate 41. Incidentally, the tilt angle of the pillar 14 can be accurately set by pointing an arrow thereof to the scale formed on the angle indexing plate 41.

(2) Temporarily placing the deep-hole boring machine 100 so that the tip end of the tool is aligned with the boring position on the concrete floor 10.

(3) Actuating the vacuum suction device 13 to fit the base 11 onto the concrete floor 10.

(4) Tilting the tool guide member 32 to a predetermined angle and fixing the tool guide member 32 with the bolt 35. Incidentally, the tilt angle of the tool guide member 32 can be accurately set by pointing the scale 35b to the pointer 35c.

Figure 5A:
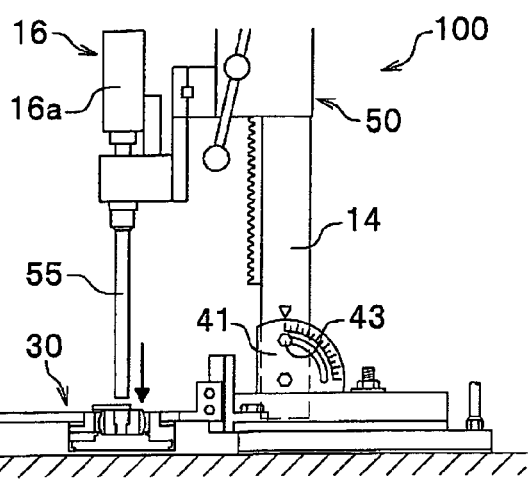
FIG. 5A is a side view showing the deep-hole boring machine having a hollow sleeve mounted thereon according to the first embodiment.
Figure 5B:
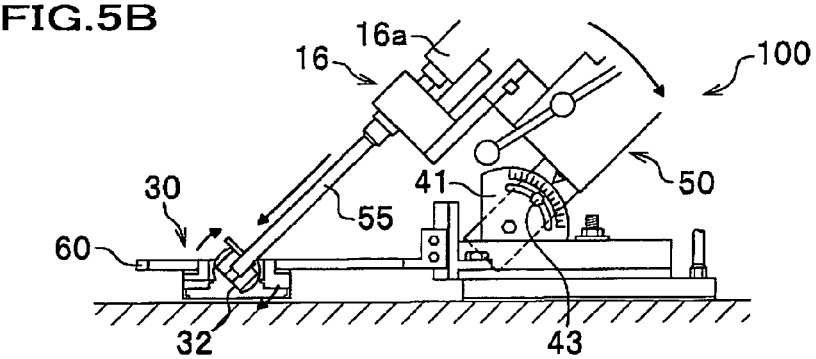
FIG. 5B is a side view showing the deep-hole boring machine according to the first embodiment, in which a tool guide member is tilted for boring an inclined hole.
Figure 5C:
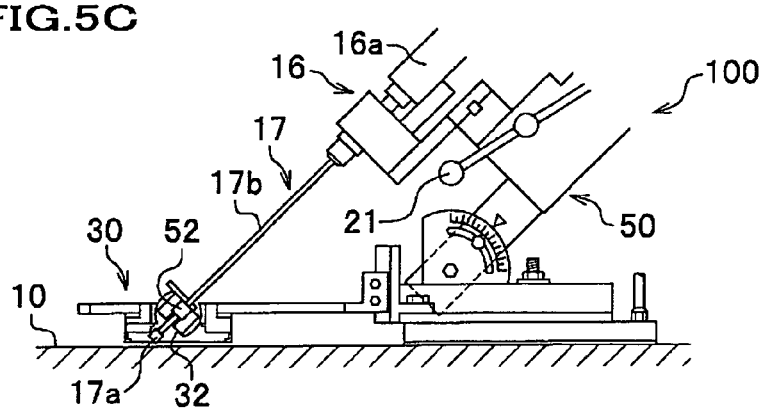
FIG. 5C is a side view showing the deep-hole boring machine according to the first embodiment, in which a guide bush is mounted on the tool guide member, and a boring tool mounted.

(5) The hollow sleeve 55, instead of the rotary tool 17, is mounted to the tool rotation driving section 16 as shown in FIG. 5A. Further, one end of the hollow sleeve 55 is inserted into the bush hole 33 of the tool guide member 32. At this time, the tool guide base 31 is horizontally moved to a predetermined position along the linear guide grooves 38, 38 of the guide base 60 (see FIG. 1).

(6) Fixing the tool guide mechanism 30 to the guide base 60 with the butterfly nuts 30d, 30d.

Figure 5D:
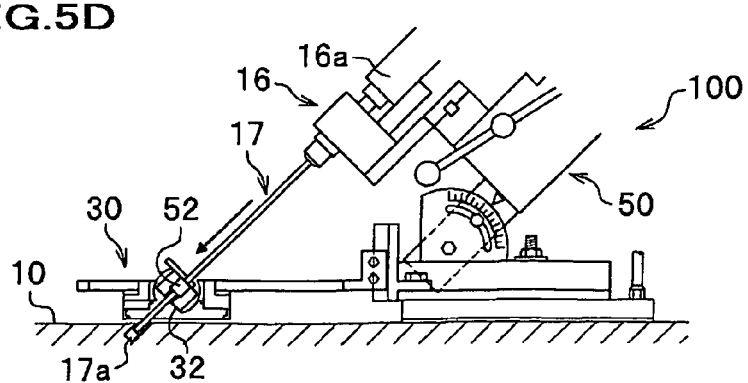
FIG. 5D is a side view showing the deep-hole boring machine according to the first embodiment, when the machine is poised to bore an inclined hole.

(7) Driving the motor 16a of the tool rotation driving section 16 to rotate the rotary tool 17 as shown in FIG. 5D. At this time, in order to cool the rotary tool 17, the pump 24 of the water supply-discharge device 20 (see FIG. 1) is actuated to pump the cooling water from the water supply hose 22a and water supply chamber 18 to the boring tool 17a through the hole 17e of the driving shaft 19a of the rotary tool 17.

(8) Operating the handle 21 to advance the boring tool 17a to the predetermined depth in the concrete floor 10. At this time, since the shaft 17b of the rotary tool 17 is guided by the guide bush 52 when advancing in the boring direction, the boring work can be stably performed.

(9) Preparing the rotary tool 17 having different length and changing the rotary tool 17 according to necessity so that the rotary tool 17 can be advanced to a predetermined depth.

(10) When the rotary tool 17 is advanced to the predetermined depth, the supply of the cooling water is stopped, the rotary tool 17 is pulled out from the concrete floor 10, and the motor 16a of the tool rotation driving section 16 is stopped.

The dirty water mixed with concrete powder generated when boring the hole is pumped by the pump 24 into the water supply-discharge device 20 through the water discharge hose 22b (see FIG. 3), and the dirty water returned to the water supply-discharge device 20 is filtered and then circulated as the cooling water.

Since the tilt angle is predetermined when performing the hole boring work, the tilt angles of the pillar 14 and the tool guide member 32 can be previously set and fixed, the position for fixing the tool guide base 31 can be determined by using the hollow sleeve 55, and therefore the boring work can be simply performed.

As discussed above, since the pillar 14 can be tilted, and since the tool guide mechanism 30 is provided, the deep-hole boring machine 100 not only can be used to bore a vertical hole, but also can be used to bore an inclined hole having a predetermined tilt angle. Further, when boring the vertical hole or the inclined hole, since the deep-hole boring machine 100 performs the boring work in a state where the shaft 17b of the rotary tool 17 is guided by the guide bush 52, the boring work can be stably performed.

Figure 10:
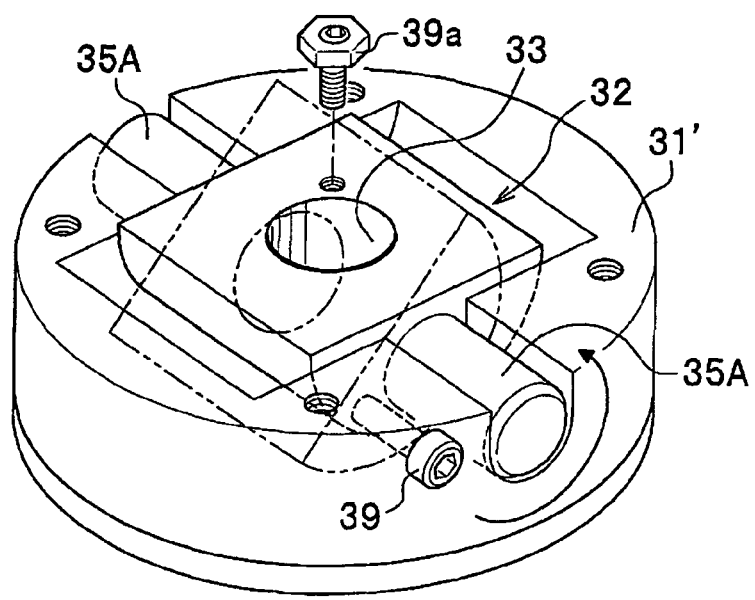
FIG. 10 is a perspective view showing an entire constitution of a modification of the tool guide mechanism of the deep-hole boring machine according to the first embodiment and a second embodiment of the present invention.

Note that the configuration of the tool guide mechanism 30 is not limited to the one described above but should include other configurations as long as the tilt angle of the tool guide mechanism 30 can be freely set. For example, the tool guide mechanism 30 may have a configuration shown in FIG. 10. As shown in FIG. 10, instead of the spherical guide member 32b and the spherical bearing 32a, a pair of guide pins 35A, 35A pivotally supported to a tool guide base 31' having a bush hole 33 formed therein is provided to tiltably support the tool guide member 32. With such a configuration, effects identical to the aforesaid embodiment can be achieved. Incidentally, as shown in FIG. 10, the tool guide member 32 is fixed by a bolt 39 from the side face.

Second Embodiment

Figure 11:
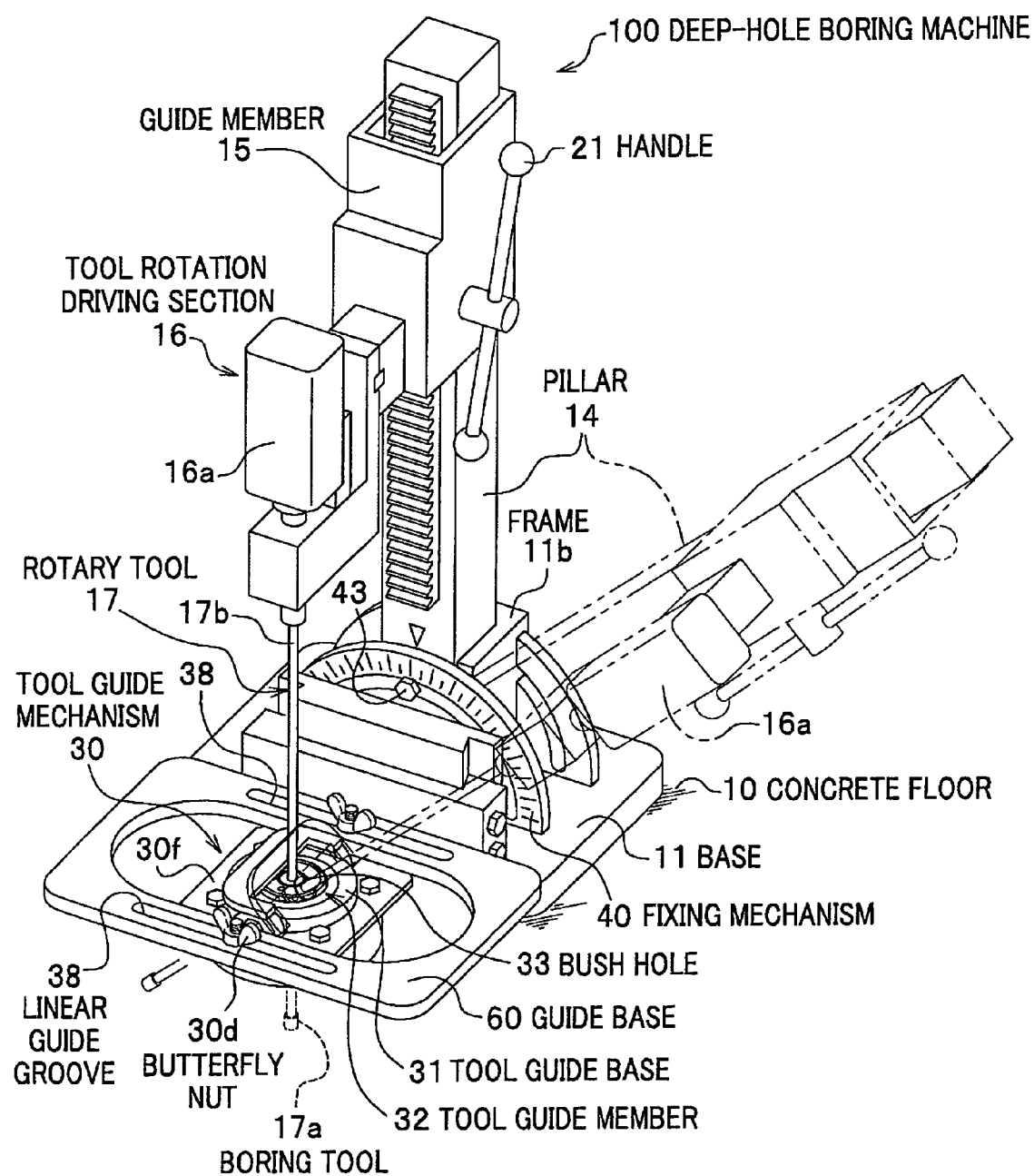
FIG. 11 is a perspective view showing the construction of the deep-hole boring machine according to the second embodiment.

FIG. 11 is a perspective view showing the second embodiment of the present invention. Incidentally, in the second embodiment, like components are denoted by like numerals as of the first embodiment and the explanation thereof will be omitted.

As shown in FIG. 11, the present embodiment is characterized in that: the base 11, which rotatably supports the pillar 14, and the guide base 60, which guides the tool guide mechanism 30, are arranged in such a manner that the rotation center line of the pillar 14 and the tilt center line of the tool guide mechanism 30 lie on one vertical plane.

The tool guide mechanism 30 is supported by the base 11 so as to be parallel to the upper face of the concrete floor 10 and is horizontally movable along a guide face of the guide base 60. The tool guide mechanism 30 has a tool guide member 32 for guiding the shaft 17b of the rotary tool 17 at a tilt angle of the rotary tool 17.

Figure 12B:
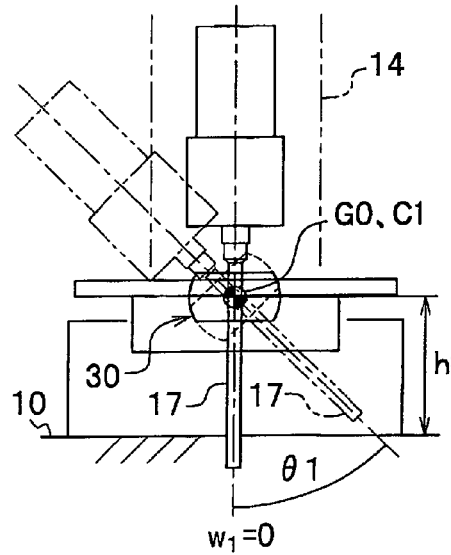
FIGS. 12B and 12C are illustrations showing the relationship between the tilt angle of the rotary tool and the tilt angle of the tool guide member according to the second embodiment.

FIG. 12B shows the relationship between the tilt angle of rotary tool 17 and the tilt angle of the tool guide member 32 of the tool guide mechanism 30 according to the second embodiment.

If the distance between the upper face of the concrete floor 10 and the rotation center C1 of the pillar 14 is defined as h, the distance between the upper face of the concrete floor 10 and the tilt center G0 of the tool guide mechanism 30 is defined as h1, and the tilt angle relative to the center line is defined as θ1, then the displacement w1 of the rotary tool 17 relative to the center line of the rotary tool 17 in horizontal direction is zero. Thus, it is possible to bore an inclined hole with the rotary tool 17 by tilting the tool guide mechanism 30 without horizontally displacing the tool guide mechanism 30. The reason that the hole can be bored in such a manner is because the rotation center C1 of the pillar 14 and the tilt center G0 of the tool guide mechanism 30 have the same height (namely, h=h1=h2) and because the rotation center C1 and the tilt center G0 are aligned in series.

Figure 12C:
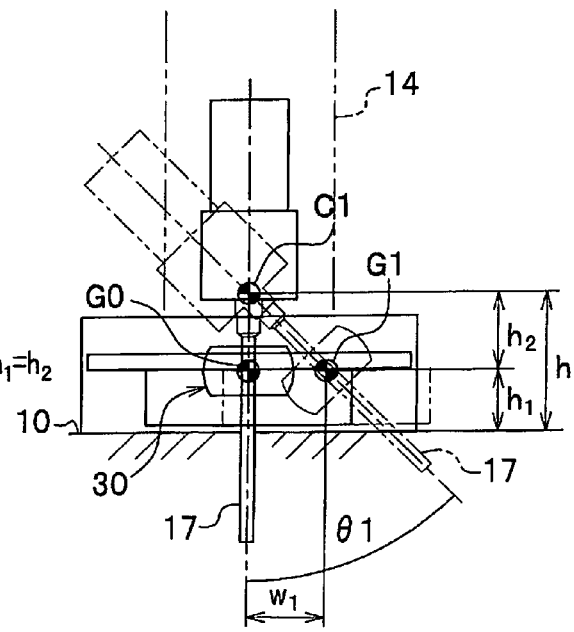

Further, as shown in FIG. 12C, if considering the time when boring a vertical hole as a reference, then in the case where the rotation center C1 of the pillar 14 and the tilt center G0 of the tool guide mechanism 30 lie on one vertical plane and where the rotation center C1 and the tilt center G0 have different heights, when the tilt angle θ1 becomes 45 degrees, the displacement w1 will become a value proportional to "h−h1". With such a configuration, the vertical hole can be bored with a very small displacement w1 of the tool guide mechanism 30, compared with the first embodiment.

Thus, in the second embodiment, since the rotary tool can be brought closer to the concrete floor compared with the first embodiment, the length of the tool can be reduced, the rigidity of the tool can be improved, and therefore the boring capacity can be enhanced.

Figure 13A:
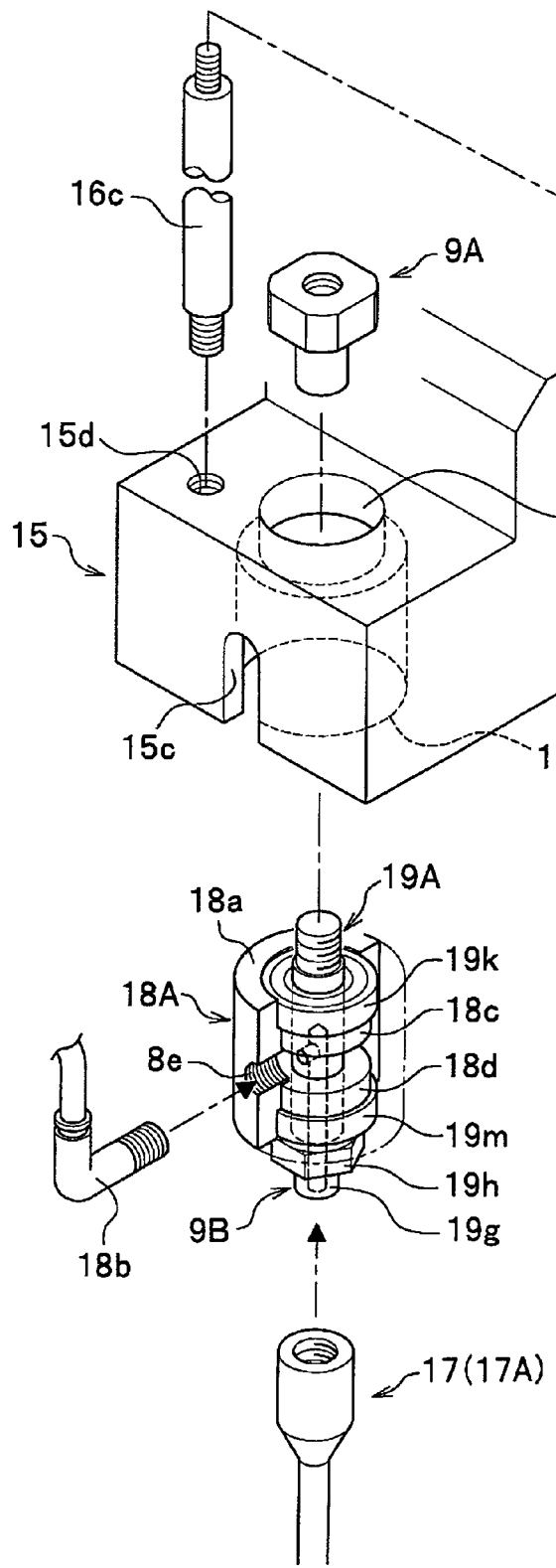
FIGS. 13A and 13B are exploded perspective views showing a modification of a water supply chamber and a tool holder according to the present invention.
Figure 13B:
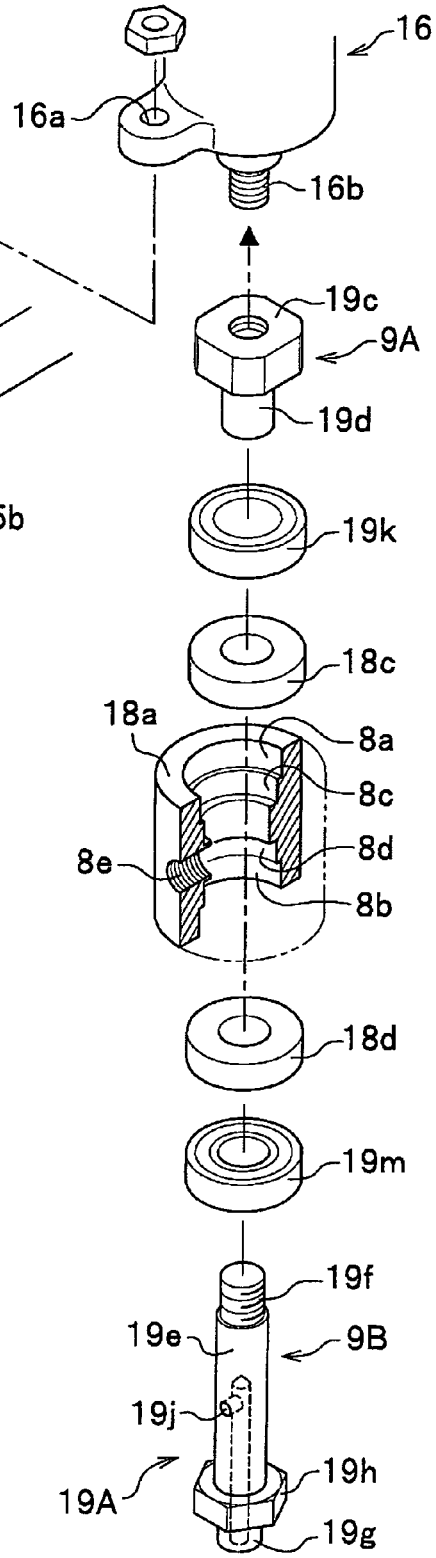
Figure 14:
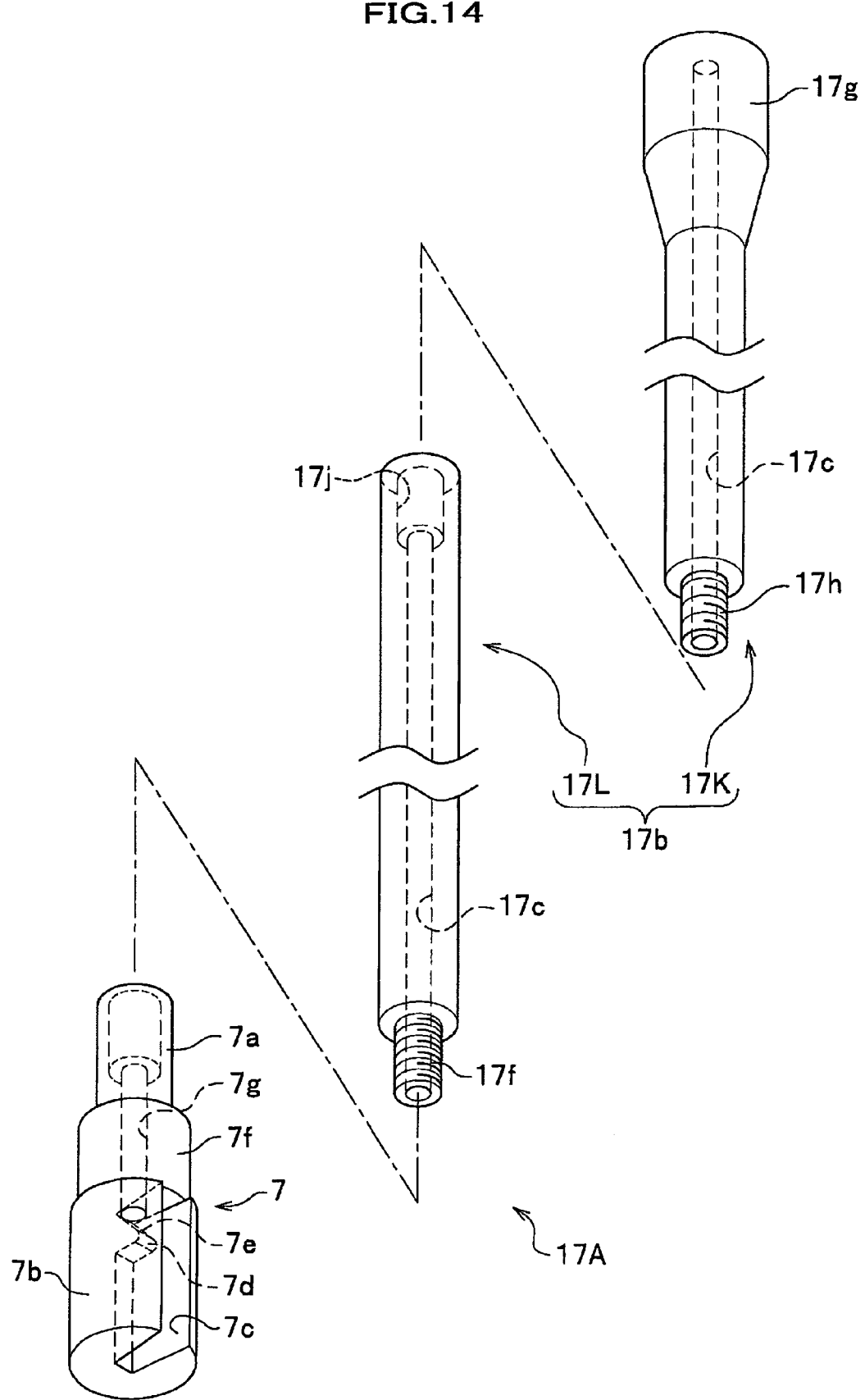
FIG. 14 is an exploded perspective view showing a modification of the rotary tool according to the present invention.
Figure 15:
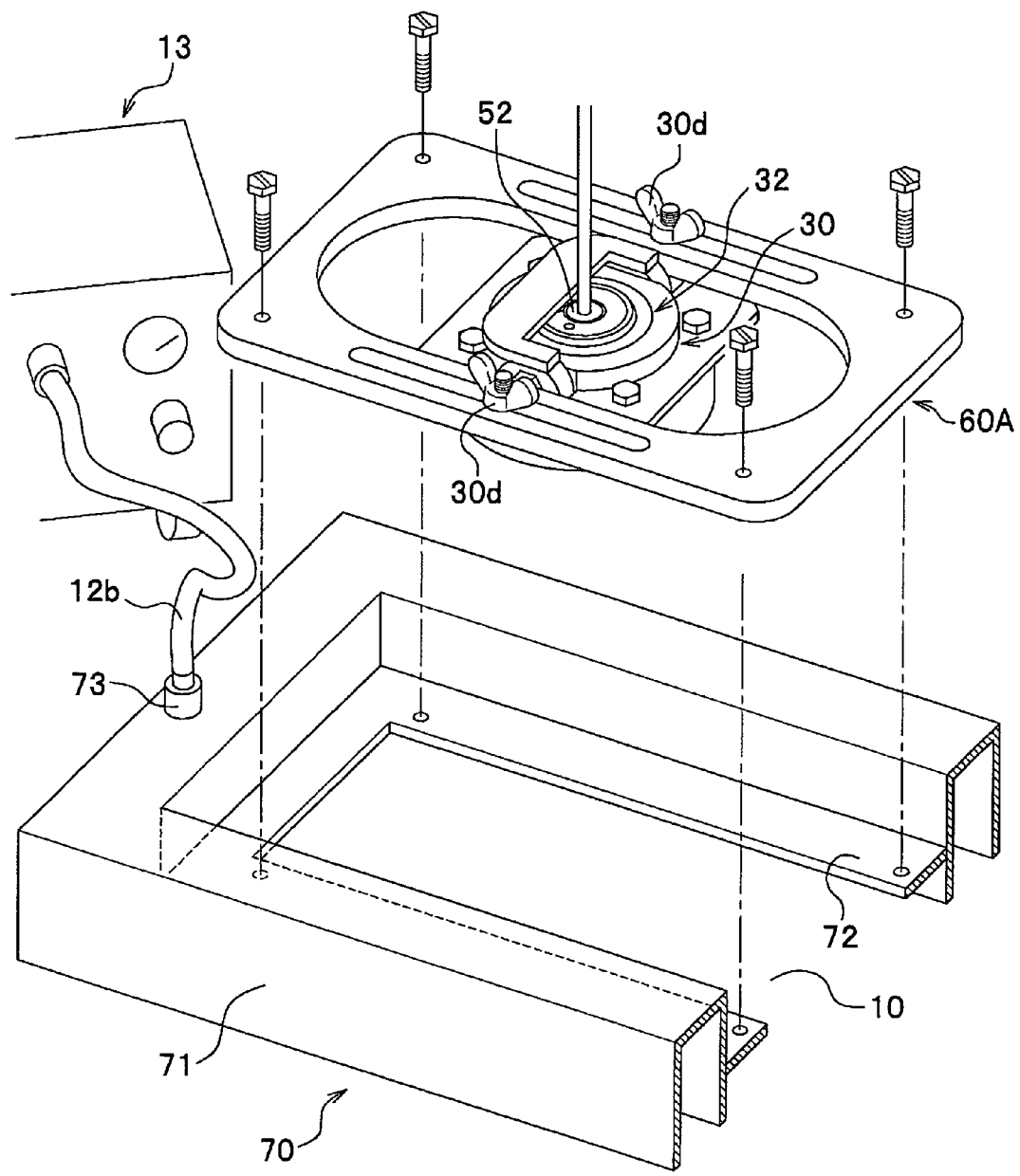
FIG. 15 is a perspective view showing a modification of a guide base of the present invention with a part thereof removed.
Figure 16A:
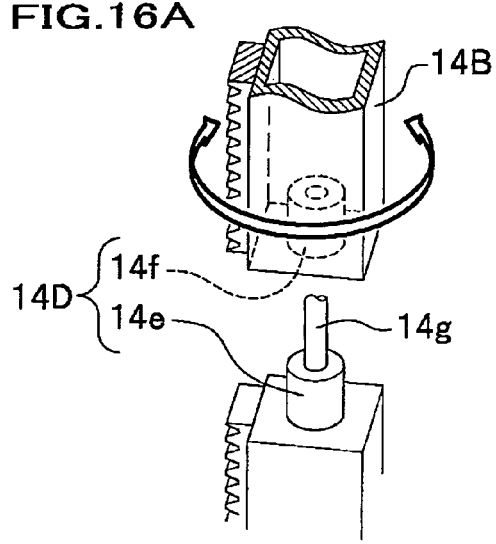
FIGS. 16A, 16B and 16C are perspective views showing a modification of a pillar of the present invention with a part thereof removed.
Figure 16B:
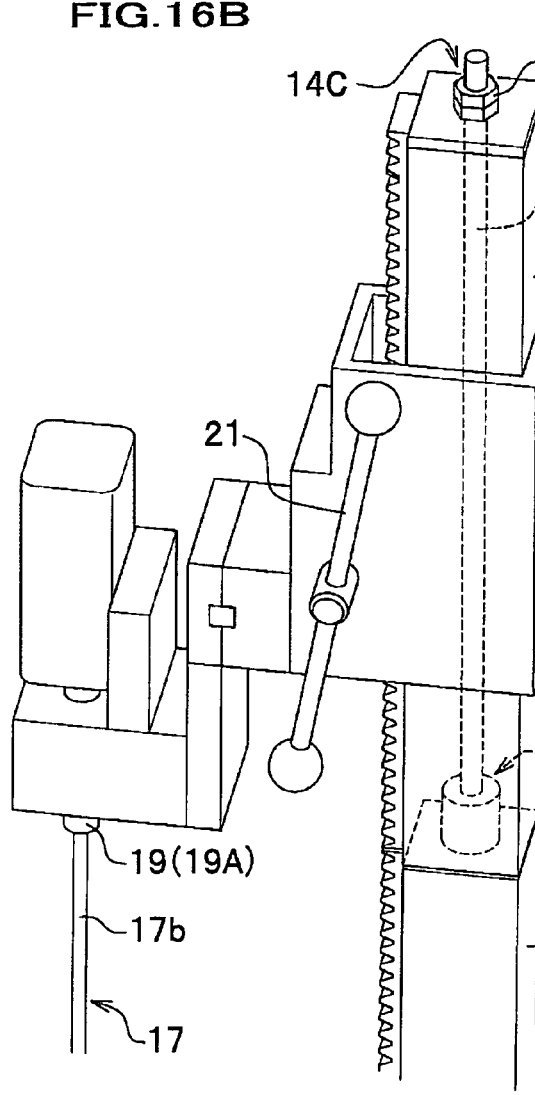
Figure 16C:
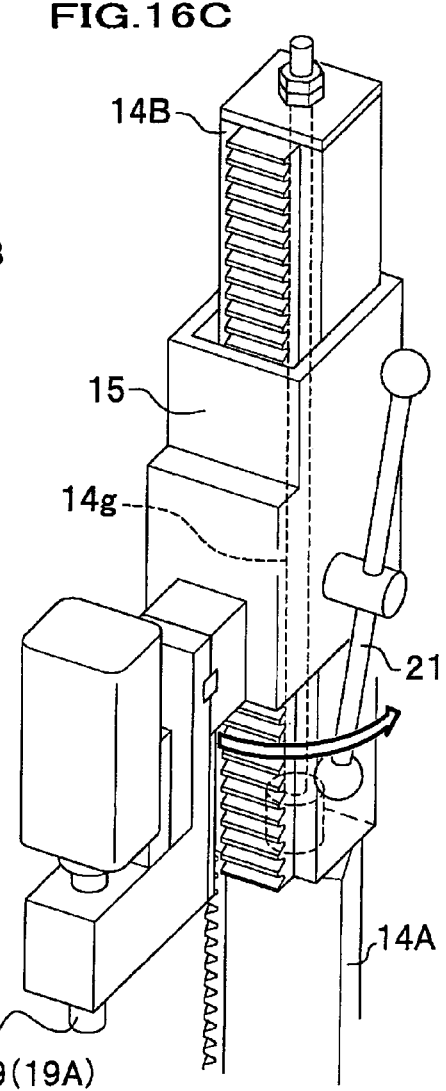

Incidentally, the water supply chamber 18, the tool holder 19A, the rotary tool 17, the boring tool 17a, the guide base 60, and the pillar 14 can have modifications respectively shown in FIGS. 13, 14, 15, 16A, 16B and 16C. The modifications of these components will be described below. FIGS. 13A and 13B are exploded perspective views showing a modification of the water supply chamber and the tool holder; FIG. 14 is an exploded perspective view showing a modification of the rotary tool; FIG. 15 is a perspective view showing a modification of the guide base with a part thereof removed; and FIGS. 16A, 16B and 16C are perspective views showing a modification of the pillar. Note that like components are denoted by like numerals as of those have already been described above, and the explanation thereof will be omitted.

As shown in FIGS. 13A and 13B, in a water supply mechanism 18A (the water supply chamber 18), a connection shaft portion 19d and a shaft body 19e (both constitute the tool holder 19A) are detachably mounted to a step-shaped guide member 15 at a position corresponding to the lowest step of the guide member 15 in a state where the connection shaft portion 19d and shaft body 19e are rotatably inserted into the guide member 15. The guide member 15 has a supporting recessed portion 15a formed therein at the position where the water supply mechanism 18A is supported and an opening 15b formed above the supporting recessed portion 15a. The diameter of the opening 15b is smaller than that of the cylindrical body 18a. A below-described first connecting member 9A of the tool holder 19A can be inserted into the opening 15b.

The water supply mechanism 18A includes a cylindrical body 18a, a hose connection portion 18b, a first oil seal 18c, and a second oil seal 18d. The hose connection portion 18b, to which the water supply hose 22a of the water supply-discharge device 20 is connected, projects from the side face of the cylindrical body 18a. The first oil seal 18c and the second oil seal 18d are provided to contain the cooling water received from the hose connection portion 18b and seal an area formed inside the cylindrical body 18a as a cooling water supply space.

As shown in FIG. 13B, the cylindrical body 18a has bearing installation portions 8a, 8b and seal installation portions 8c, 8d formed on the inner side thereof. The bearing installation portions 8a, 8b and seal the installation portions 8c, 8d are stepwise formed respectively from two ends toward the center thereof. Further, the cylindrical body 18a has a screw hole 8e formed in the height-directional center of the side surface thereof, and the hose connection portion 18b is detachably screwed into the screw hole 8e.

As shown in FIG. 13A, the hose connection portion 18b is mounted to the cylindrical body 18a by being screwed into the screw hole 8e of the cylindrical body 18a. The water supply hose 22a connected from the outside is detachably connected to the hose connection portion 18b. The guide member 15 has a notch 15c formed therein at a position corresponding to the hose connection portion 18b.

The first oil seal 18c and the second oil seal 18d, both having the same structure, are respectively arranged in the seal installation portions 8c, 8d of the cylindrical body 18a. Both the first oil seal 18c and second oil seal 18d, which allow the tool holder 19A to be rotatably and liquid-tightly mounted to the center, are ring-shaped and have publicly known configuration.

As shown in FIG. 13B, the tool holder 19A includes a first connecting member 9A detachably connected to the driving shaft 16b of the tool rotation driving section 16, and a second connecting member 9B having one end thereof detachably connected to the first connecting member 9A and the other end thereof connected by the rotary tool 17.

The first connecting member 9A includes a bolt-head-like drill connection portion 19c having a female screw formed therein for engaging with the driving shaft 16b of the tool rotation driving section 16, and an axis-like connection shaft portion 19d continuously extending from the drill connection portion 19c and having a diameter smaller than that of the drill connection portion 19c. Incidentally, the drill connection portion 19c and the connection shaft portion 19d having a female screw formed therein for making both portions communicate with each other. Further, the drill connection portion 19c has a spanner-cut-surface 17s formed on the side surface thereof so that the drill connection portion 19c can be operated with a wrench or spanner from the outside.

The second connecting member 9B includes a male threaded portion 19f formed on one end side of the shaft body 19e and detachably screwed with the connection shaft portion 19d of the first connecting member 9A; a tool connection portion 19g formed on the other end side of the shaft body 19e and detachably screwed with the connection portion of the rotary tool; and a tool operation portion 19h provided to the shaft body 19e at a position closer to the center of the shaft than the tool connection portion 19g, the tool operation portion 19h being operated with a wrench or spanner from the outside; and a communication hole 19j formed on the side face of the shaft body 19e at a position closer to the center of the shaft than the tool operation portion 19h.

Incidentally, the shaft body 19e has a through-hole which passes through the shaft body 19e from the communication hole 19j to the tool connection portion 19g. Further, the tool connection portion 19g has a male screw formed on the outer circumference thereof, so that the female screw portion of the rotary tool 17 can be engaged with the tool connection portion 19g.

In the tool holder 19A, as shown in FIGS. 13A and 13B, in a state where the first oil seal 18c and the second oil seal 18d are respectively installed to the seal installation portions 8c, 8d of the cylindrical body 18a and where the first bearing 19k and the second bearing 19m are respectively installed to the bearing installation portions 8a, 8b of the cylindrical body 18a, the second connecting member 9B is inserted from the second bearing 19m toward the first bearing 19k. Further, by engaging the connection shaft portion 19d of the first connecting member 9A with the male threaded portion 19f projecting from the first bearing 19k, the tool holder 19A is rotatably and liquid-tightly installed penetrating the water supply mechanism 18A. Incidentally, in the water supply mechanism 18A, the area surrounded by the first oil seal 18c, the second oil seal 18d and the cylindrical body 18a serves as the cooling water supply space to supply the cooling water around the communication hole 19j of the tool holder 19A.

Further, the tool holder 19A connects the drill connection portion 19c of the first connecting member 9A to the driving shaft 16b of the tool rotation driving section 16. When the tool holder 19A is connected to the driving shaft 16b, the cylindrical body 18a of the water supply chamber 18 is fitted into the supporting recessed portion 15a of the guide member 15 so as to be supported. In the state where the water supply chamber 18 is supported by the guide member 15, the hose connection portion 18b projects from the notch 15c of the guide member 15.

Further, the rotary tool 17A is mounted by engaging the female screw portion of the rotary tool 17A with the tool connection portion 19g of the second connecting member 9B (which is the other end of the tool holder 19A).

As shown in FIG. 14, the rotary tool 17A also can be configured by a below-described boring tool 7, an extension shaft 17L and an engaging shaft 17K (the extension shaft 17L and the engaging shaft 17K serving as the shaft 17b). The extension shaft 17L has two screw portions (a male screw portion and a female screw portion herein) 17j, 17f respectively formed on both ends thereof, and a through-hole 17c penetrating the inside thereof. Further, the engaging shaft 17K has a screw portion 17g (female screw portion herein) formed on one end thereof, a screw portion 17h (male screw portion herein) formed on the other end thereof, and a through-hole 17c penetrating the inside thereof. The screw portion 17g engages with the tool holder 19, and the screw portion 17h engages with the shaft 17b. It is preferred that the shaft 17b is used when the depth of the deep-hole to be bored exceeds 100 cm.

Incidentally, in the water supply mechanism 18A, the area surrounded by the first oil seal 18c, the second oil seal 18d and the cylindrical body 18a serves as the cooling water supply space to supply the cooling water around the communication hole 19j of the tool holder 19A. Further, the cooling water of the water supply chamber 18 is supplied from the communication hole 19j of the tool holder 19A to the boring tool 7 via the through-hole 17c penetrating the shaft 17b in the axis direction.

As shown in FIG. 14, the boring tool 7 includes a rotary shaft 7a having a flow path 7g formed therein, and a boring portion 7b attached to a tip-end face of the rotary shaft 7a and having a groove 7c formed therein to communicate with the flow path 7g. Further, the groove 7c is formed from a tip-end face to a base-end face of the boring portion 7b and is formed in such a manner that the circumference in a cross section perpendicular to the axial direction of the boring portion 7b is at least partially opened. The depth of the groove 7c is large enough to reach the central axis of the boring portion 7b. Further, a projecting portion 7d projecting from the bottom of the groove 7c toward the inside of the groove 7c is formed on the groove 7c, near the base-end face of the boring portion 7b. The height of the projecting portion 7d is such that, when viewing from the tip-end face of the boring portion 7b, the flow path 7g of the rotary shaft 7a can not be seen. An inclined face 7e is formed on one side of the projecting portion 7d on the base-end face side, the inclined face 7e being inclined toward the flow path 7g. Further, the rotary shaft 7a has a different-diameter portion 7f formed on the boring portion 7b side. The different-diameter portion 7f also can have a spanner-cut-surface 17s (not shown) formed on the side surface thereof, so that the different-diameter portion 7f can be operated with a wrench or spanner from the outside.

Incidentally, the groove 7c may have such a shape that the width of the groove 7c gradually increases from the center toward the circumference of the boring portion 7b. The groove 7c may also have such a shape that, in a cross section of the groove 7c parallel to the axial direction of the boring portion, the depth of the groove 7c gradually decreases from the tip-end face toward the base-end face of the boring portion 7b.

When the boring tool 7 is rotated to bore a hole in the concrete floor, the cooling water supplied from the water supply chamber 18 through the through-hole 17c of the shaft 17b is released from the flow path 7g toward the inclined face 7e of the projecting portion 7d. Further, the released cooling water is supplied from the inclined face 7e of the projecting portion 7d to the part performing boring work through the groove 7c. The concrete powder generated by the boring portion 7b when performing the boring work is mixed with the supplied cooling water and forcibly sucked up from between the shaft 17b and the side wall of the concrete hole by the water supply-discharge device 20. With such a boring tool 7, the working efficiency of boring work can be more improved. Incidentally, the boring tool 7 used here has a diameter of 7 mm or 9 mm.

Further, as shown in FIG. 15, the following configuration also can be adopted in which the guide base 60A is not supported by the base 11, but is singly fixed to the concrete floor 10 by a fixing frame 70 through the vacuum suction device 13.

When fixing the guide base 60A, the fixing frame 70 is sucked and fixed to the concrete floor 10 by operating the vacuum suction device 13. The fixing frame 70 includes a frame body 71 and a supporting frame 72. The frame body 71 is formed by folding an U-shaped frame material into a square annular shape where the open part of the U-shape is the lower face of the frame body 71. The supporting frame 72 is formed on the inner peripheral surface of the frame body 71 at a position having a predetermined height from the lower end.

Further, the frame body 71 has a connection port 73 formed at a predetermined position on the upper surface thereof to allow the flexible hose 12b to be detachably connected thereto. Further, the supporting frame 72 has screw holes formed therein at predetermined positions for supporting the guide base 60A. Incidentally, flexible element made of, for example, synthetic rubber, rubber or the like is provided on the lower end which contacts the concrete floor 10, so that the fixing frame 70 can be fixed to the concrete floor 10 even if the concrete floor 10 has an uneven surface.

The fixing frame 70 is mounted to the working face in a state where the guide base 60A is fixed to the supporting frame 72 by the screws. Further, the frame body 71 is fixed to the concrete floor 10 since being vacuum sucked by the vacuum suction device 13 through the flexible hose 12b. By performing the hole boring work in a condition where the fixing frame 70 is not supported by the base 11, the hole boring work can be performed even in the case where the concrete floor 10 for mounting the base 11 and the concrete floor 10 for mounting the fixing frame 70 respectively lie in two different inclined planes.

Further, as shown in FIGS. 16A, 16B and 16C, the following configuration also can be adopted in which the pillar 14 includes a base pillar 14A and a rotary pillar 14B arranged above the base pillar 14A and capable of rotating around a pillar axis via a connector 14C. Similar to the base pillar 14A, the rotary pillar 14B has a rack 14c formed on one side face thereof. The base pillar 14A has a first engaging portion (projection) 14e of an engaging mechanism 14D formed on an upper end thereof to allow the rotary pillar 14B rotate around the pillar axis. Further, the rotary pillar 14B has a second engaging portion (recess) 14f of the engaging mechanism 14D formed on a lower end thereof to allow the rotary pillar 14B rotate with respect to the first engaging portion 14e. Incidentally, the engaging mechanism 14D has female screw formed in the inner side thereof to allow a below-described bolt 14g screw therein from above. The connector 14C includes a bolt 14g for linking the upper end and the engaging mechanism 14D, and nuts 14h for fixing the bolt 14g to the upper end face of the rotary pillar 14B. Incidentally, two nuts 14h are used here.

Since the pillar 14 has the rotary pillar 14B, when replacing the shaft 17b of the base pillar 14A with a longer replacement during the boring work, the replacement operation can be performed in the following sequence: operating the handle 21 to move the guide member 15 to a position of the rotary pillar 14B and fastening a wing bolt (not shown) to fix the guide member 15 to the position of the rotary pillar 14B; turning the rotary pillar 14B by 90 degrees around the pillar axis after the rotary tool 17A is detached from the tool holder 19; inserting the longer rotary tool 17A into the formed hole; turning back the rotary pillar 14B by 90 degrees to its original position, operating the handle 21 in a state where the wing bolt (not shown) is loosened; and lowering the tool holder 19 to an upper end portion of the rotary tool 17A inserted into the hole to screw the rotary tool 17A into the tool holder 19.

Incidentally, the rotary tool 17A can be replaced with a replacement whose length is, for example, 40 cm longer than the replaced one every time the replacement operation is performed. As an example, a deep-hole having length of 220 cm has been bored by using such a method. Herein, by using the boring tool 7, a deep-hole having a diameter of 9 mm or 7 mm can be bored. If the length of the rotary tool 17A exceeds 100 cm, the shaft 17b can be extended by engaging the components as shown in FIG. 14 to each other. Herein, the rotary tool 17A is effective to be used to bore a hole having a depth-to-diameter ratio of 10 or higher, more effective to be used to bore a hole having a depth-to-diameter ratio of 20 or higher, further more effective to be used to bore a hole having a depth-to-diameter ratio of 30 or higher, and most effective to be used to bore a hole having a depth-to-diameter ratio of 50 or higher.

Further, as shown in FIGS. 13A and 13B, the guide member 15 has a fixing screw hole 15d formed near the opening 15b thereof. A bar-like supporting rod 16c is detachably screwed into the fixing screw hole 15d. The supporting rod 16c is engaged with a supporting portion of the tool rotation driving section 16 through a nut so as to prevent the tool rotation driving section 16 from rotating. Incidentally, the following configuration also can be adopted in which the supporting rod 16c supports the whole tool rotation driving section 16 while preventing the tool rotation driving section 16 from rotating. Further, the configuration for supporting the tool rotation driving section 16 while preventing the tool rotation driving section 16 from rotating is not particularly limited and can be configured by, although not shown in the drawings, a supporting piece horizontally projecting from the guide member 15 to support the side portion of the tool rotation driving section 16.

Further, the following configuration also can be adopted in which the connection shaft portion 19d of the first connecting member has a length to penetrate the water supply mechanism 18A, and the communication hole 19j is formed in the side face of the connection shaft portion 19d to supply the cooling water to the through-hole 17c of the shaft 17b.

Further, when the rotary tool 17, 17A is used, the hollow sleeve 55 is not necessary if the tool guide member 32 is previously set to a predetermined angle according to the tilt angle of the pillar 14.

Figure 17A:
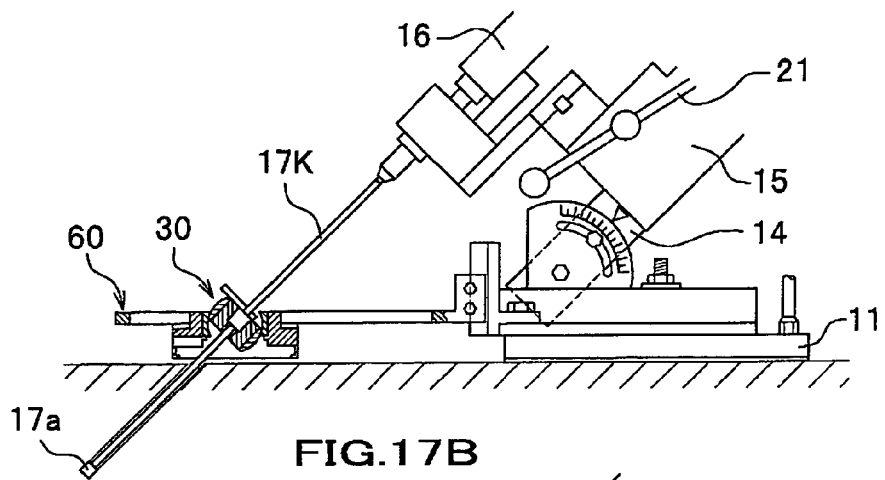
FIGS. 17A, 17B and 17C are partially sectioned illustrations schematically showing operating procedure of the deep-hole boring machine of the present invention.
Figure 17B:
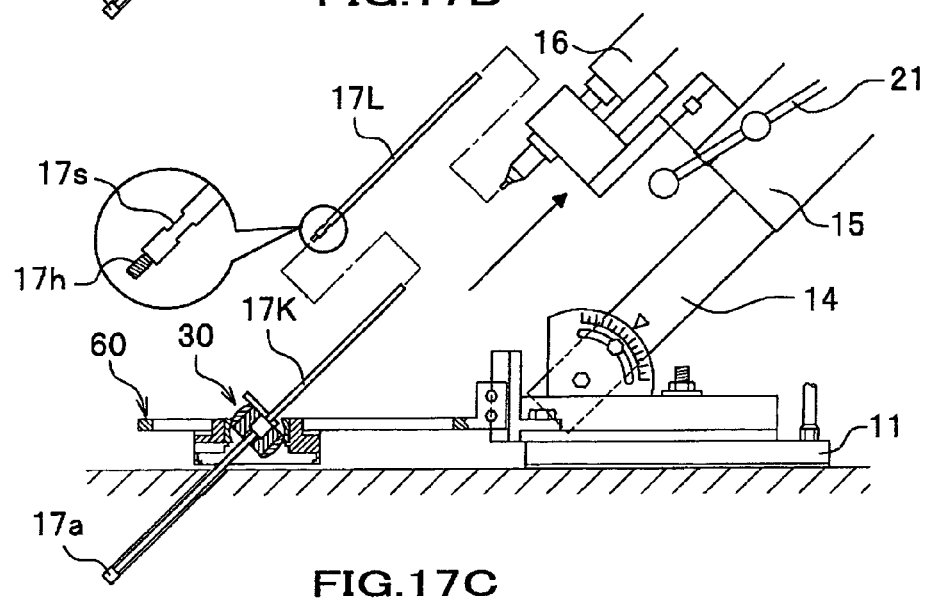
Figure 17C:
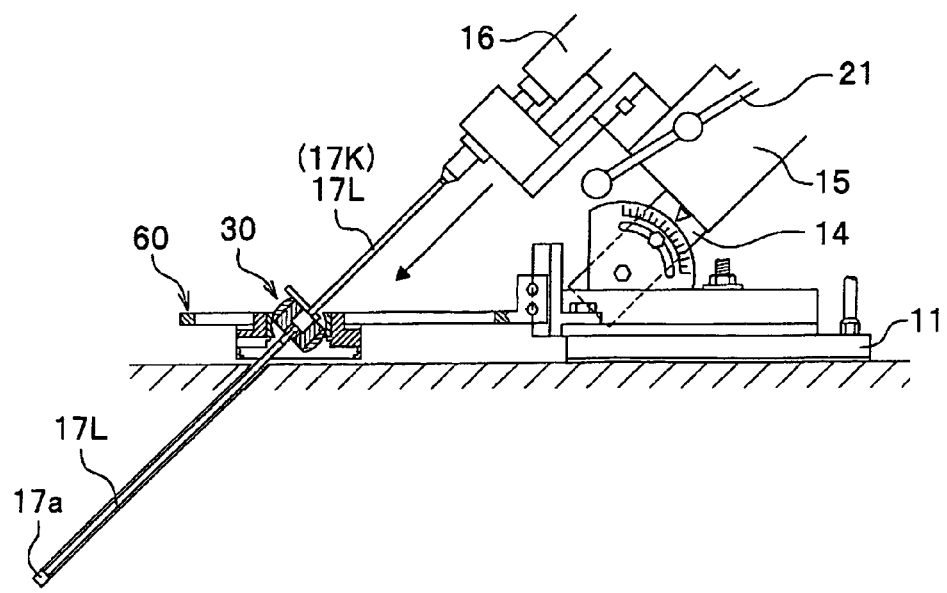

Further, as shown in FIGS. 17A to 17C, the following configuration also can be adopted in which that, in a state where the part of the rotary tool 17A has been inserted into the deep-hole being bored, the portion engaging to the driving shaft 16b of the engaging shaft 17K and the shaft portion can be detachably screwed to each other, so that the shaft portion can be added without pulling out the part having been inserted into the deep-hole being bored.

Further, by detachably screwing the portion engaging to the driving shaft 16b of the engaging shaft 17K and the shaft portion to each other, the following deep-hole boring work can be performed.

As shown in FIG. 17A, firstly, the deep-hole boring work is performed by the rotary tool 17A mounted to the tool rotation driving section 16, where the tool rotation driving section 16 is lowered to the lower end of the pillar 14 by the handle 21.

As shown in FIG. 17B, the tool rotation driving section 16 is stopped by operating a switch or the like so that the rotation of the rotary tool is stopped. Further, the engaging shaft 17K is dismounted by disengaging its engaging portion engaged with the shaft portion and its engaging portion engaged with the driving shaft 16b by rotating the shaft portion with a spanner or the like. Further, the guide member is lifted along the pillar 14 by operating the handle 21, and a now extension shaft 17L is mounted by operating a spanner-cut-surface thereof with a spanner to rotate the extension shaft 17L so that the both ends of the extension shaft 17L are respectively screwed to the engaging portion engaged to the driving shaft 16b and to the shaft portion guided by the tool guide mechanism 30.

As shown in FIG. 17C, after the new extension shaft 17L is mounted, the tool rotation driving section 16 is actuated again by operating the switch or the like, and the deep-hole boring work is continued with the rotary tool 17A.

By repeating the operation as shown in FIGS. 17A to 17C, the deep-hole boring work for boring a deep-hole having a predetermined depth can be performed without dismounting the rotary tool 17A from the tool guide mechanism. Thus, the deep-hole boring work as shown in FIGS. 17A to 17C is excellent in workability compared with a deep-hole boring work in which the rotary tool 17A is pulled out from the hole during the boring work.

What is claimed is:

1. A deep-hole boring machine comprising:
   a base to be detachably fixed to a concrete working face through a fixing means;
   a pillar tiltably supported by a supporting member through a pin to an upper face of the base;
   a fixing mechanism arranged on the base and for fixing the pillar at a desired angle;
   a guide member guided along the pillar;
   a rotary tool formed by a long shaft portion having a boring tool mounted to a tip end thereof;
   a rotation driving mechanism detachably fixed to the guide member and for rotationally driving the rotary tool;
   a rising/descending mechanism for moving the guide member along the pillar;
   a guide base supported by the base so as to be parallel to the working face; and
   a tool guide mechanism supported horizontally movable along a horizontal guide face of the guide base and for guiding the shaft portion of the rotary tool in compliance with a tilt angle of the rotary tool.

2. The deep-hole boring machine according to claim 1, wherein
   the guide base supported by the base, to which the pillar is tiltably mounted, wherein the guide base supports the tool guide mechanism to be in parallel with the pillar, so that a rotation center line of the pillar and a tilt center line of the tool guide mechanism extend parallel to each other but lie on different vertical planes.

3. The deep-hole boring machine according to claim 1, wherein
   the guide base supported by the base, to which the pillar is tiltably mounted, wherein the guide base supports the tool guide mechanism so that a rotation center line of the pillar and a tilt center line of the tool guide mechanism lie on the same plane.

4. The deep-hole boring machine according to claim 1, wherein
   the tool guide mechanism includes: a guide bush for tiltably supporting the shaft portion of the rotary tool; a tool guide base for detachably fixing the guide bush and tiltably supported by the guide base at a tilt angle of the pillar; and a guide fixing means for fixing the tool guide base at a predetermined tilt angle.

5. The deep-hole boring machine according to claim 1, wherein
   the tool guide mechanism includes: a tool guide base having a through-hole formed in the center portion thereof; a spherical guide member fitted into the through-hole of the tool guide base; a spherical bearing tiltably fitted into a spherical surface portion of the spherical guide member and having a through-hole formed in the center portion thereof; a tool guide member fitted into the through-hole of the spherical bearing and having a bush hole formed in the center portion thereof; a guide bush detachably fitted into a bush hole of the tool guide member and for guiding a shaft portion of the rotary tool; and a fixture for fixing the guide bush to the tool guide member.

6. The deep-hole boring machine according to claim 1, wherein
   the tool guide mechanism includes: a tool guide base having a through-hole formed in the center portion thereof; a tool guide member pivotally supported to the through-hole of the tool guide base by a pair of guide pins and having a bush hole formed at the center thereof; a fixing bolt for fixing the tool guide member at a predetermined tilt angle; a guide bush detachably fitted into a bush hole of the tool guide member and having a guide hole formed therein for guiding a shaft portion of the rotary tool; and a fixture for fixing the guide bush to the tool guide member.

7. The deep-hole boring machine according to claim 1, further comprising:
   a water supply-discharge device configured to supply cooling water to the tip end of the rotary tool through the rotary tool held by a tool holder of the rotation driving mechanism, and configured to discharge used cooling water from the guide base to the water supply-discharge device, so that the cooling water can be used in a circular manner.

8. The deep-hole boring machine according to claim 1, wherein
   the guide member has a supporting recessed portion for supporting a water supply mechanism supplying cooling water to the boring tool, the supporting recessed portion communicating with a through-hole formed in the rotary tool in its axial direction;
   a shaft part of a tool holder for rotatably holding the rotary tool to the rotation driving mechanism penetrates the water supply mechanism;
   the water supply mechanism includes a cylindrical body supported by the supporting recessed portion; a first oil seal and a second oil seal spaced apart from each other inside the cylindrical body so as to form a cooling water supply space, the first oil seal and second oil seal being arranged in a manner that allow the shaft part of the tool holder to rotate; and a hose connection portion for supplying the cooling water to the cooling water supply space formed by the first oil seal and second oil seal from a side face of the cylindrical body through a water supply hose; and
   the shaft part of the tool holder has a communication hole formed in the side face thereof corresponding to the supply space to communicate with the through-hole.

9. The deep-hole boring machine according to claim 8, where
the tool holder includes a first connecting member having one end thereof detachably connected to the driving shaft of the rotation driving mechanism and a second connecting member having one end thereof detachably connected to the first connecting member and the other end thereof detachably connected to the shaft portion;
a communication hole is formed in a side face of either the one end of second connecting member or the other end of the first connecting member as the shaft part;
the first connecting member is rotatably supported through a first bearing disposed between the first oil seal and one end of the cylindrical body, and the second connecting member is rotatably supported through a first bearing disposed between the second oil seal and the other end of the cylindrical body.

10. The deep-hole boring machine according to claim 1, wherein
the pillar includes a base pillar, a rotary pillar and an engaging mechanism, the rotary pillar being connected to an upper portion of the base pillar by a connector and capable of rotating about the axis of the pillar for a predetermined angle, the engaging mechanism being provided at a lower end of the rotary pillar and an upper end of the base pillar for engaging the rotary pillar and the base pillar with each other so that the rotary pillar can rotate about the axis of the pillar.

11. A deep-hole boring machine to be fixed to a concrete working face for boring a hole having a depth-to-diameter ratio of 10 or higher, the deep-hole boring machine comprising:
a base to be detachably fixed to the working face through a fixing means;
a pillar tiltably supported by a supporting member arranged on the base through a support shaft;
a fixing mechanism for fixing the pillar at a predetermined tilt angle;
a rotation driving mechanism for supporting and rotationally driving a rotary tool which is formed by detachably mounting a boring tool to a tip end of the shaft portion;
a guide member for guiding the rotation driving mechanism along the pillar and supporting the rotation driving mechanism;
a rising/descending mechanism for moving the guide member along the pillar;
a guide base arranged on an extension line of the shaft portion supported by the rotation driving mechanism and detachably fixed to the working face through the fixing means; and
a tool guide mechanism horizontally movable along a horizontal guide face of the guide base and for guiding the shaft portion of the rotary tool in the boring direction in compliance with a tilt angle of the rotary tool.

12. The deep-hole boring machine according to claim 11, wherein
the guide base supported by the base, to which the pillar is tiltably mounted, wherein the guide base supports the tool guide mechanism to be in parallel with the pillar, so that a rotation center line of the pillar and a tilt center line of the tool guide mechanism extend parallel to each other but lie on different vertical planes.

13. The deep-hole boring machine according to claim 11, wherein
the guide base supported by the base, to which the pillar is tiltably mounted, wherein the guide base supports the tool guide mechanism so that a rotation center line of the pillar and a tilt center line of the tool guide mechanism lie on the same plane.

14. The deep-hole boring machine according to claim 11, wherein
the tool guide mechanism includes: a guide bush for tiltably supporting the shaft portion of the rotary tool; a tool guide base for detachably fixing the guide bush and tiltably supported by the guide base at a tilt angle of the pillar; and a guide fixing means for fixing the tool guide base at a predetermined tilt angle.

15. The deep-hole boring machine according to claim 11, wherein
the tool guide mechanism is horizontally movable along a guide face of the guide base and includes: a tool guide base having a through-hole formed in the center portion thereof; a spherical guide member fitted into the through-hole of the tool guide base; a spherical bearing tiltably fitted into a spherical surface portion of the spherical guide member and having a through-hole formed in the center portion thereof; a tool guide member fitted into the through-hole of the spherical bearing and having a bush hole formed in the center portion thereof; a guide bush detachably fitted into a bush hole of the tool guide member and for guiding a shaft portion of the rotary tool; and a fixture for fixing the guide bush to the tool guide member.

16. The deep-hole boring machine according to claim 11, wherein
the tool guide mechanism is horizontally movable along a guide face of the guide base and includes: a tool guide base having a through-hole formed in the center portion thereof; a tool guide member pivotally supported to the through-hole of the tool guide base by a pair of guide pins and having a bush hole formed at the center thereof; a fixing bolt for fixing the tool guide member at a predetermined tilt angle; a guide bush detachably fitted into a bush hole of the tool guide member and having a guide hole formed therein for guiding a shaft portion of the rotary tool; and a fixture for fixing the guide bush to the tool guide member.

17. The deep-hole boring machine according to claim 11, further comprising:
a water supply-discharge device configured to supply cooling water to the tip end of the rotary tool through the rotary tool held by a tool holder of the rotation driving mechanism, and configured to discharge used cooling water from the guide base to the water supply-discharge device, so that the cooling water can be used in a circular manner.

18. The deep-hole boring machine according to claim 11, wherein
the guide member has a supporting recessed portion for supporting a water supply mechanism supplying cooling water to the boring tool, the supporting recessed portion communicating with a through-hole formed in the rotary tool in its axial direction;
a shaft part of a tool holder for rotatably holding the rotary tool to the rotation driving mechanism penetrates the water supply mechanism;
the water supply mechanism includes a cylindrical body supported by the supporting recessed portion; a first oil seal and a second oil seal spaced apart from each other inside the cylindrical body so as to form a cooling water supply space, the first oil seal and second oil seal being arranged in a manner that allow the shaft part of the tool holder to rotate; and a hose connection portion for supplying the cooling water to the cooling water supply space formed by the first oil seal and second oil seal from a side face of the cylindrical body through a water supply hose; and the shaft part of the tool holder has a communication hole formed in the side face thereof corresponding to the supply space to communicate with the through-hole.

19. The deep-hole boring machine according to claim 18, where the tool holder includes a first connecting member having one end thereof detachably connected to the driving shaft of the rotation driving mechanism and a second connecting member having one end thereof detachably connected to the first connecting member and the other end thereof detachably connected to the shaft portion;

a communication hole is formed in a side face of either the one end of second connecting member or the other end of the first connecting member as the shaft part;

the first connecting member is rotatably supported through a first bearing disposed between the first oil seal and one end of the cylindrical body, and the second connecting member is rotatably supported through a first bearing disposed between the second oil seal and the other end of the cylindrical body.

20. The deep-hole boring machine according to claim 11, wherein the pillar includes a base pillar, a rotary pillar and an engaging mechanism, the rotary pillar being connected to an upper portion of the base pillar by a connector and capable of rotating about the axis of the pillar for a predetermined angle, the engaging mechanism being provided at a lower end of the rotary pillar and an upper end of the base pillar for engaging the rotary pillar and the base pillar with each other so that the rotary pillar can rotate about the axis of the pillar.

21. A deep-hole boring guide device to be fixed to a concrete working face for boring a hole having a depth-to-diameter ratio of 10 or higher, the deep-hole boring guide device comprising:

a base to be detachably fixed to the working face through a fixing means;

a pillar tiltably supported by a supporting member arranged on the base through a support shaft;

a fixing mechanism for fixing the pillar at a predetermined tilt angle;

a guide member for guiding a rotation driving mechanism, which supports and rotationally drives a rotary tool which is formed by detachably mounting a boring tool to a tip end of the shaft portion, along the pillar and supporting the rotation driving mechanism;

a rising/descending mechanism for moving the guide member along the pillar;

a guide base supported by the base and fixed to the working face; and a tool guide mechanism horizontally movable along a horizontal guiding face of the guide base and for guiding the shaft portion of the rotary tool in the boring direction in compliance with a tilt angle of the rotary tool.

22. A deep-hole boring guide device to be fixed to a concrete working face for boring a hole having a depth-to-diameter ratio of 10 or higher, the deep-hole boring guide device comprising:

a base to be detachably fixed to the working face through a fixing means;

a pillar tiltably supported by a supporting member arranged on the base through a support shaft;

a fixing mechanism for fixing the pillar at a predetermined tilt angle;

a guide member for guiding a rotation driving mechanism, which supports and rotationally drives a rotary tool which is formed by detachably mounting a boring tool to a tip end of the shaft portion, along the pillar and supporting the rotation driving mechanism;

a rising/descending mechanism for moving the guide member along the pillar;

a guide base arranged on an extension line of the shaft portion supported by the rotation driving mechanism and detachably fixed to the working face through the fixing means; and a tool guide mechanism horizontally movable along a horizontal guiding face of the guide base and for guiding the shaft portion of the rotary tool in the boring direction in compliance with a tilt angle of the rotary tool.

* * * * *